US006944132B1

(12) United States Patent
Aono et al.

(10) Patent No.: US 6,944,132 B1
(45) Date of Patent: Sep. 13, 2005

(54) TRANSMISSION APPARATUS, ORDER WIRE TRANSMISSION SYSTEM AND ORDER WIRE MONITORING METHOD

(75) Inventors: Yuta Aono, Kawasaki (JP); Kimio Watanabe, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 09/537,785

(22) Filed: Mar. 29, 2000

(30) Foreign Application Priority Data

Jul. 9, 1999 (JP) ................................ 11-195474

(51) Int. Cl.[7] ......................... G01R 31/08; H04M 3/22
(52) U.S. Cl. ...................... 370/241; 370/248; 370/252; 379/1.03; 379/12; 379/15.05
(58) Field of Search ................................ 370/241–242, 370/245, 247–250, 252; 379/1.01, 1.03, 2, 379/93.01, 14.01, 12, 15.05, 16, 21, 22.01, 379/22.02–22.04, 32.01–32.05

(56) References Cited

U.S. PATENT DOCUMENTS 4,550,425 A * 10/1985 Andersen et al. ........... 704/212
5,111,497 A * 5/1992 Bliven et al. ............ 379/27.01
5,734,696 A * 3/1998 Day .......................... 379/9.06
5,784,406 A * 7/1998 DeJaco et al. .............. 375/224
6,477,238 B1 * 11/2002 Schneider et al. ....... 379/22.04
6,515,967 B1 * 2/2003 Wei et al. ................... 370/244

FOREIGN PATENT DOCUMENTS

JP 7-303149 11/1995
JP 9-55798 2/1997

* cited by examiner

*Primary Examiner*—John Pezzlo
*Assistant Examiner*—Saba Tsegaye
(74) *Attorney, Agent, or Firm*—Katten Muchin Rosenman

(57) ABSTRACT

An order wire monitoring method monitors form a monitoring control terminal a quality of an order wire line which couples transmission apparatuses via multiplexed lines which multiplex and transmit main and order wire signals. A transmission apparatus which is to transmit test data and a transmission apparatus which is to receive test data are specified from the monitoring control terminal, and the test data are transmitted from a specified transmitting apparatus to the order wire line in response to a start of test instructed from the monitoring control terminal. The monitoring control terminal monitors the quality of the order wire line based on information received from the specified receiving apparatus via the specified transmitting apparatus.

16 Claims, 17 Drawing Sheets

FIG.18A

| | S' | Nmax |
|---|---|---|
| I | 10 | 2 |
| II -1 | 5 | 6 |
| II -2 | 9 | 20 |
| III | 0 | 1 |

FIG.18B

| | S'/S | S'/Nmax | Nmax | LINE JUDGEMENT |
|---|---|---|---|---|
| I | 10/10 | 10/2 | 2 | FAILURE |
| II -1 | 5/10 | 5/6 | 6 | LINE NOISE DUE TO QUANTIZATION ERROR ACCUMULATION |
| II -2 | 9/10 | 9/20 | 20 | LINE NOISE DUE TO QUANTIZATION ERROR ACCUMULATION |
| III | 0/10 | 0/1 | 1 | SETTING OR CONNECTION ERROR |

TRANSMISSION APPARATUS, ORDER WIRE TRANSMISSION SYSTEM AND ORDER WIRE MONITORING METHOD

BACKGROUND OF THE INVENTION

1. Field of the Invention

The present invention generally relates to transmission apparatuses, order wire transmission systems and order wire monitoring methods, and more particularly to a transmission apparatus which includes functions for transmitting and receiving multiplexed signals in various kinds of networks and functions for transmitting and receiving order wire signals, an order wire transmission system which uses such a transmission apparatus, and an order wire monitoring method for monitoring quality and the like of an order wire line.

2. Description of the Related Art

FIG. 1 is a system block diagram generally showing an order wire transmission system. In FIG. 1, transmission apparatuses A and B are connected via a radio or cable line, transmission apparatuses C and D are connected via a radio or cable line, and transmission apparatuses E and F are connected via a radio or cable line. Each of the transmission apparatuses A through F includes functions for transmitting and receiving a main signal with another transmission apparatus, and functions for transmitting and receiving an order wire signal. The transmission apparatuses B, C and E are located within a single office S, and the order wire signal is branched and combined in the office S.

FIG. 2 is a system block diagram for explaining an important part of a conventional transmission apparatus. In FIG. 2, a transmission apparatus 71 corresponds to the transmission apparatus B shown in FIG. 1. The transmission apparatus 71 includes an optical or radio transmitter and receiver section 72 transmits and receives an optical signal or a radio signal, a multiplexing and demultiplexing section 73, and an order wire section 74. The order wire section 74 includes a codec section 75, an analog branching and combining section 76, an office Dual Tone Multi Frequency (DTMF) transmitting and retrieving section 77, and a 2-wire/4-wire (2W/4W) converter 78. A telephone set 79 is connected to the 2W/4W converter 78. The transmission apparatuses C and D have the same construction as the transmission apparatus B (71), and are connected to the transmission apparatus B (71). In FIG. 2, the illustration of transmission paths for the multiplexed signals exchanged among the transmission apparatuses B, C and D is omitted.

The multiplexing and demultiplexing section 73 carries out a multiplexing process and a demultiplexing process in conformance with a multiplexing system such as Plesiochronous Digital Hierarchy (PDH), Synchronous Digital Hierarchy (SDH) and the like. For example, the order wire signals are multiplexed in specific time slots in the case of the PDH, and the order wire signals are multiplexed by section overhead bytes E1 and E2 in the case of the SDH. Accordingly, the multiplexing and demultiplexing section 73 is constructed to multiplex and demultiplex the order wire signals depending on the multiplexing system employed.

When connecting to an optical line, the optical or radio transmitter and receiver section 72 has optical-to-electrical converting functions and optical wavelength multiplexing and demultiplexing functions. On the other hand, when connecting to a radio line, the optical or radio transmitter and receiver section 72 has high-frequency transmitting and receiving functions corresponding to transmission frequency or modulation technique employed. In addition, when connecting to a cable line for exchanging electrical signals, the optical or radio transmitter and receiver section 72 has functions for transmitting and receiving digital multiplexed signals.

In the order wire section 74, the codec section 75 carries out coding and decoding, including analog-to-digital conversion. The office DTMF transmitting and retrieving section 77 transmits, receives and identifies a DTMF signal used by push-button type telephone sets. The 2W/4W converter 78 carries out a 2-wire-to-4-wire (2W/4W) conversion. The digital received order wire signals which are demultiplexed by the multiplexing and demultiplexing section 73 are converted into analog signals by the codec section 75, and are branched into three by the analog branching and combining section 76. The office DTMF transmitting and retrieving section 77 judges whether or not the received DTMF signal specifies the transmission apparatus 71 to which the office DTMF transmitting and retrieving section 77 belongs. The office DTMF transmitting and retrieving section 77 also includes functions for transmitting a DTMF signal which specifies another transmission apparatus, such as the transmission apparatus C or E.

When making a call using the telephone set 79, audio signals are input to the codec section 75 via the 2W/4W converter 78 and the analog branching and combining section 76, and are converted into digital signals. The digital signals are input to the multiplexing and demultiplexing section 73, and are multiplexed, as order wire signals, to a main signal, in conformance with the multiplexing system employed.

For example, when communicating between the transmission apparatuses A and F shown in FIG. 1 via an order wire line, the branching and combining of the order wire signals are carried out via the analog branching and combining section 76 in the intermediate transmission apparatus B as shown in FIG. 2. In addition, in the transmission apparatuses B and E which are located between the transmission apparatuses A and F, the telephone sets are put into the on-hook state. For example, if the telephone set 79 of the transmission apparatus B, which is located between the transmission apparatuses A and F, is put into the off-hook state, the communication using the order wire signals cannot be made between the transmission apparatuses A and F. But in this state, a communication using the order wire signals is possible with the transmission apparatus A or the transmission apparatus F using this telephone set 79.

In a system which transmits multiplexed signals by connecting a plurality of transmission apparatuses by a line such as the cable line, optical line and radio line, the order wire line corresponding to one channel is prepared for making a prearranged communication between the transmission apparatuses. This order wire line is shared by each of the transmission apparatuses, so as to enable the prearranged communication between arbitrary transmission apparatuses. In such a system, even when the multiplexed main signal can be transmitted and received, a connection error may exist in one transmission apparatus with respect to the order wire line, in which case the order wire line cannot be connected between the transmission apparatuses which are located on both ends of this one transmission apparatus.

Accordingly, in a case of a failure where only the order wire line cannot be connected, it is necessary to send a maintenance or service person to each transmission apparatus, to make a prearranged communication test between the transmission apparatuses, and to find the transmission apparatus which cannot make the prearranged communication, so that a restoration process can be carried out with respect to the failure. Normally, however, the transmission apparatuses are scattered, and two transmission apparatuses are separated by a distance on the order of several tens of km or greater. For this reason, it takes considerable time and effort on the part of the maintenance or service persons, due to the need to simultaneously or successively send the maintenance or service person to each transmission apparatus and to carry out the prearranged communication test.

In addition, the order wire signals which are demultiplexed from the multiplexed main signal are converted into analog signals by the codec section 75, branched by the analog branching and combining section 76 and distributed to the telephone set and the adjacent transmission apparatuses. Moreover, the analog order wire signals are combined by the analog branching and combining section 76, and converted into digital signal by the codec section 75. In other words, the digital-to-analog conversion is carried out every time the order wire signals are branched, and the analog-to-digital conversion is carried out every time the order wire signals are combined. As a result, quantization errors are accumulated by the conversions which are carried out repeatedly, and a failure may be generated in the prearranged communication due to this quantization error accumulation. When such a failure occurs, it is also necessary to send the maintenance or service person to each transmission apparatus and to successively carry out the prearranged communication test via the order wire line between the transmission apparatuses, similarly as described above, in order to find the cause of the failure and correct the failure. Consequently, it takes considerable time and effort on the part of the maintenance or service persons to find and correct the failure.

SUMMARY OF THE INVENTION

Accordingly, it is a general object of the present invention to provide a novel and useful transmission apparatus, order wire transmission system and order wire monitoring method, in which the problems described above are eliminated.

Another and more specific object of the present invention is to provide a transmission apparatus, order wire transmission system and order wire monitoring method, which enable a failure of an order wire line to be found at an arbitrary transmission apparatus, by merely adding a simple structure to an existing system structure.

Still another object of the present invention is to provide a transmission apparatus comprising: a multiplexing and demultiplexing section which carries out a multiplexing and a demultiplexing; and an order wire section which converts received order wire signals demultiplexed by the multiplexing and demultiplexing section into analog signals, and converts transmitting order wire signals into digital signals which are input to the multiplexing and demultiplexing section, the order wire section comprising: a codec section carrying out an analog-to-digital conversion and a digital-to-analog conversion with respect to order wire signals; a branching and combining section branching and combining analog order wire signals; a 2-wire/4-wire converter which is capable of coupling to a telephone set; and a monitoring processor which includes a storage section storing transmitting and received data, and an order wire monitoring controller, the order wire monitoring controller controlling transmission of test data stored in the storage section to an order wire line, controlling storage of test data received via the order wire line to the storage section, and controlling transmission and reception of one of the received test data, analyzed data of the received test data, and judgement data indicative of a judgement result of a comparison of the analyzed data and threshold values. According to the transmission apparatus of the present invention, it is possible to monitor the quality of the order wire line using a simple construction.

A further object of the present invention is to provide an order wire transmission system which couples a plurality of transmission apparatuses via multiplexed lines which multiplex and transmit main and order wire signals, wherein: each transmission apparatus includes a multiplexing and demultiplexing section and an order wire section, the order wire section comprising a codec section carrying out an analog-to-digital conversion and a digital-to-analog conversion with respect to order wire signals, a branching and combining section branching and combining analog order wire signals, a 2-wire/4-wire converter which is capable of coupling to a telephone set, and a monitoring processor; the monitoring processor including a storage section storing transmitting and received data, and an order wire monitoring controller which controls transmission of test data stored in the storage section to an order wire line, controls storage of test data received via the order wire line to the storage section, and controlling transmission of the received test data and analyzed data of the received test data; and the order wire monitoring controller including a function of receiving and identifying control information which specifies transmission or reception of the test data, a function of transmitting the test data from the storage section when specified to transmit test data, a function of receiving and storing the test data in the storage section when specified to receive the test data, and a function of controlling transmission of one of the received test data stored in the storage section, the analyzed data of the received test data, and judgement data indicative of a judgement result of a comparison of the analyzed data and threshold values, after a predetermined time or at a specified time. According to the order wire transmission system of the present invention, it is possible to monitor the quality of the order wire line, without having to send a maintenance or service person to each of the transmission apparatuses which are generally located distant from each other.

Another object of the present invention is to provide an order wire monitoring method for monitoring a quality of an order wire line which couples a plurality of transmission apparatuses via multiplexed lines which multiplex and transmit main and order wire signals, comprising the steps of: specifying a transmission apparatus which is to transmit test data as a specified transmitting apparatus, and a transmission apparatus which is to receive test data as a specified receiving apparatus; transmitting the test data from the specified transmitting apparatus to the order wire line in response to a start of test; receiving and temporarily storing the test data in the specified receiving apparatus; transmitting to the specified transmitting apparatus one of the stored received test data, analyzed data of the received test data, and judgement data indicative of a judgement result of a comparison of the analyzed data and threshold values, after a predetermined time or at a specified time; and monitoring, in the specified transmitting apparatus, the quality of the order wire line between the specified transmitting apparatus and the specified receiving apparatus. According to the order wire monitoring method of the present invention, it is possible to monitor the quality of the order wire line, without having to send a maintenance or service person to each of the transmission apparatuses which are generally located distant from each other. Further, the quality of the order wire line between desired transmission apparatuses may be monitored from an arbitrary transmission apparatus.

Other objects and further features of the present invention may be apparent from the following detailed description when read in conjunction with the accompanying drawings.

BRIEF DESCRIPTION OF THE DRAWINGS

FIGS. 18A and 18B are diagrams for explaining judgement results; and

DESCRIPTION OF THE PREFERRED EMBODIMENTS

Figure 3:
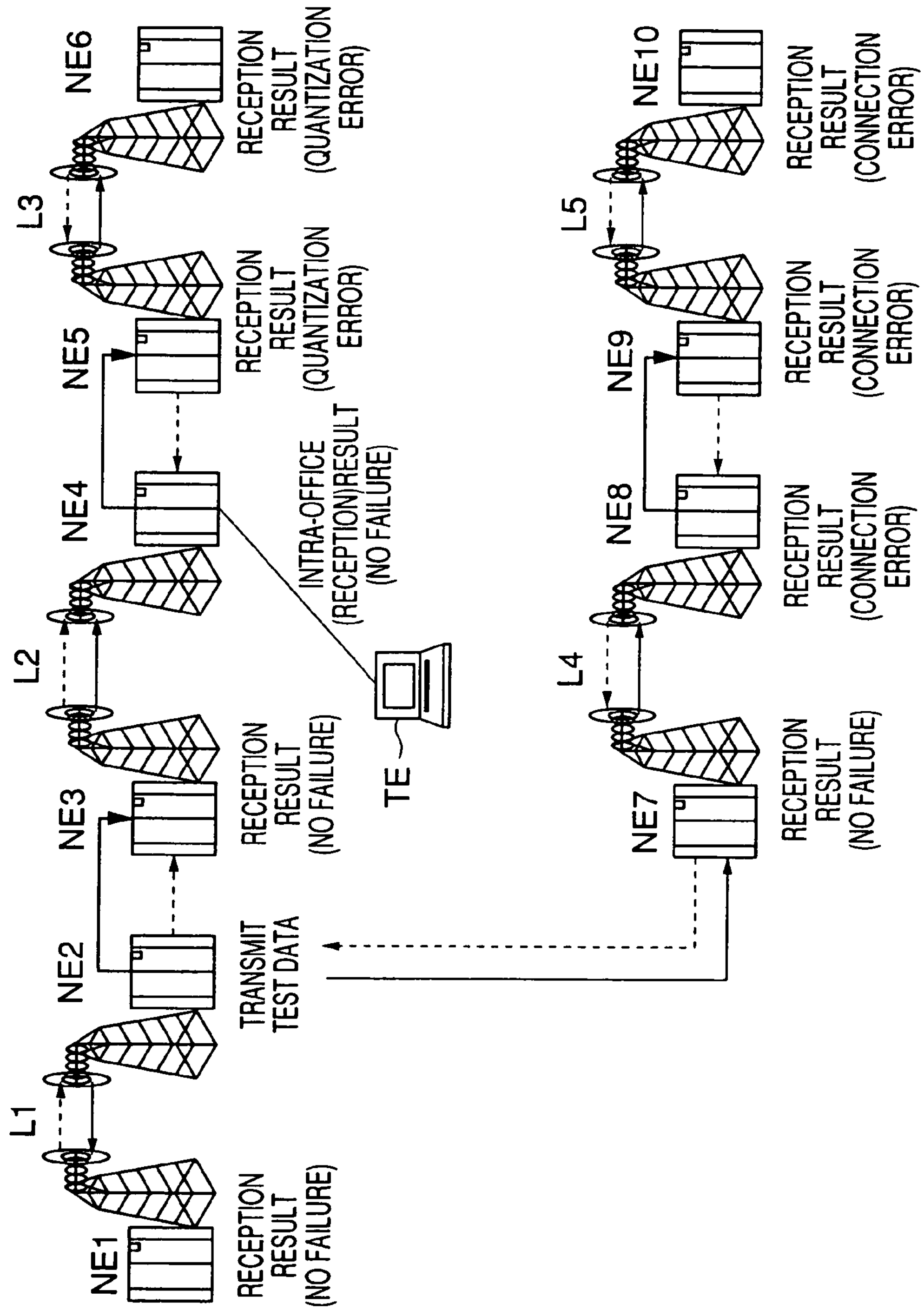
FIG. 3 is a diagram for explaining an embodiment of an order wire transmission system according to the present invention.

FIG. 3 is a diagram for explaining an embodiment of an order wire transmission system according to the present invention. In FIG. 3, NE1 through NE10 indicate transmission apparatuses, and L1 through L5 indicate lines. It is assumed for the sake of convenience that the lines L1 through L5 are radio lines, but it is of course possible to use cable lines or optical lines for the lines L1 through L5. Further, it is assumed for the sake of convenience in FIG. 3 that the transmission apparatuses NE2, NE3 and NE7 form a single office, the transmission apparatuses NE4 and NE5 form a single office, and the transmission apparatuses NE8 and NE9 form a single office.

Each of the transmission apparatuses NE1 through NE10 includes a monitoring processor which is connected to an order wire line. For example, in response to an instruction from a monitoring control terminal TE which is connected to the transmission apparatus NE4, the monitoring processor operates so that processes such as transmission of test data via the order wire line, analysis of received test data, and returning results of the analysis are carried out between specified transmission apparatuses. The monitoring processor also has a function of prestoring the test data. In FIG. 3, a transmitting direction of the test data is indicated by a solid line arrow, and a transmitting direction of the analyzed data or judgement data is indicated by a phantom line arrow.

For example, the monitoring control terminal TE specifies the transmission apparatus NE2 as a test data transmitting office (specified test data transmitting transmission apparatus), and specifies the transmission apparatus NE1 as a test data receiving office (specified test data receiving transmission apparatus). When the monitoring control terminal TE instructs a test of the order wire line to start, the test data stored in the monitoring processor of the transmission apparatus NE2 are transmitted to the transmission apparatus NE1 via the order wire line. The transmission apparatus NE1 receives and analyzes the test data, and obtains judgement data indicating judgement results related to a setting of the order wire line, existence of an connection error, accumulation of quantization error and the like. The judgement data are returned to the transmission apparatus NE2. The transmission apparatus NE2 transfers the judgement data to the monitoring control terminal TE via the transmission apparatuses NE3 and NE4, so that a maintenance or service person can monitor the state or normality of the order wire line between the transmission apparatuses NE1 and NE2.

In addition, the monitoring control terminal TE is capable of specifying the transmission apparatus NE6, for example, as the test data receiving office, so as to carry out the prearranged communication test. In other words, the analog audio signals from a telephone set of the transmission apparatus NE4 are converted into digital audio data, and prearranged communication data are transmitted via the order wire line, and the transmission apparatus NE6 demultiplexes the prearranged communication data from the multiplexed signals and temporarily stores the prearranged communication data in a storage section of the monitoring processor. Depending on an instruction included in control information which is received from the transmission apparatus NE4 or, after a predetermined elapses, the audio data of the prearranged communication data stored in the storage section are looped back and transmitted via the order wire line. Accordingly, at the transmission apparatus NE4, it is possible to receive the audio data which are transmitted and looped back, and to confirm the audio quality by the telephone set which is connected to the order wire line. In this case, no howling occurs, although howling would occur if a simple loop-back test were made.

Moreover, in a case where a connection error of the order wire line exists in the transmission apparatus NE8, for example, the transmission apparatus NE2, for example, is specified as the test data transmitting office by a control signal, so as to transmit the test data to the order wire line from the transmission apparatus NE2. In addition, the transmission apparatuses NE7, NE8, NE9 and NE10, for example are specified as the test data receiving offices by a control signal. In this case, the transmission apparatus NE7 returns judgement data indicating normal reception of the test data. On the other hand, the transmission apparatuses NE8 through NE10 cannot receive the test data because of the connection error, and return, as the control information, judgement data indicating the connection error. Accordingly, the monitoring control terminal TE which receives the judgement data from the transmission apparatuses TE7 through TE10 can recognize that it is normal up to the transmission apparatus NE7, and that the connection error or the like exists at the transmission apparatus NE8 because the transmission apparatus NE8 was not able to receive the order wire signals. Therefore, it is only necessary to send the maintenance or service person to the transmission apparatus NE8 to have the failure corrected.

Figure 4:
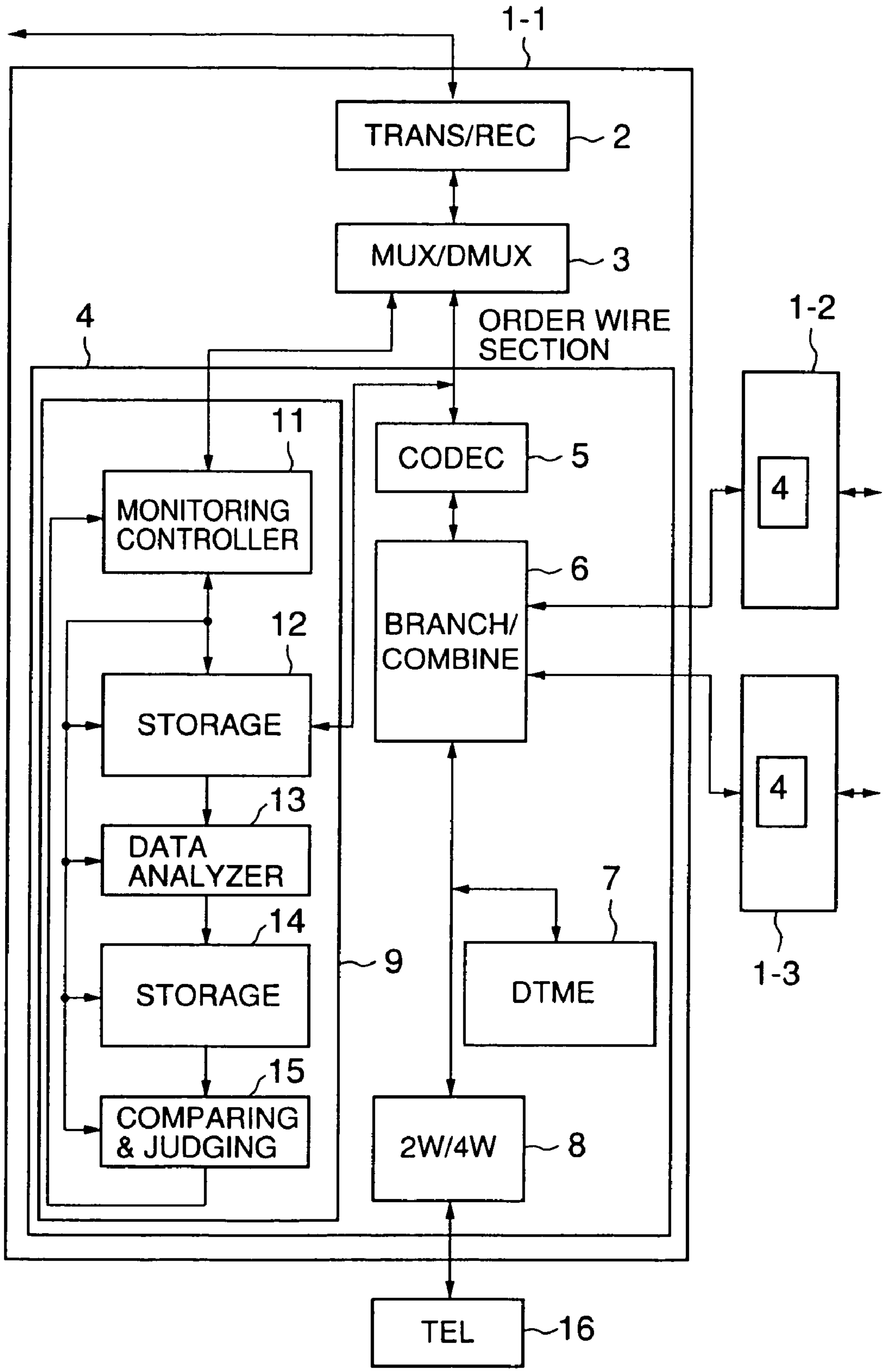
FIG. 4 is a system block diagram showing an important part of a first embodiment of a transmission apparatus according to the present invention.

FIG. 4 is a system block diagram showing an important part of a first embodiment of a transmission apparatus according to the present invention.

FIG. 4 shows three transmission apparatuses 1-1, 1-2 and 1-3, and the construction of the transmission apparatus 1-1. The transmission apparatus 1-1 includes a transmitter and receiver section 2, a multiplexing and demultiplexing section 3, and an order wire section 4. The order wire section 4 includes a codec section 5, an analog branching and combining section 6, an office DTMF transmitting and retrieving section 7, a 2W/4W converter 8, and a monitoring processor 9. The monitoring processor 9 includes an order wire monitoring controller 11, a transmitting and received data storage section 12, a data analyzer 13, an analyzed data storage section 14, and a comparing and judging section 15. A telephone set 16 is connected to the 2W/4W converter 8 of the order wire section 4 within the transmission apparatus 1-1.

Figure 1:
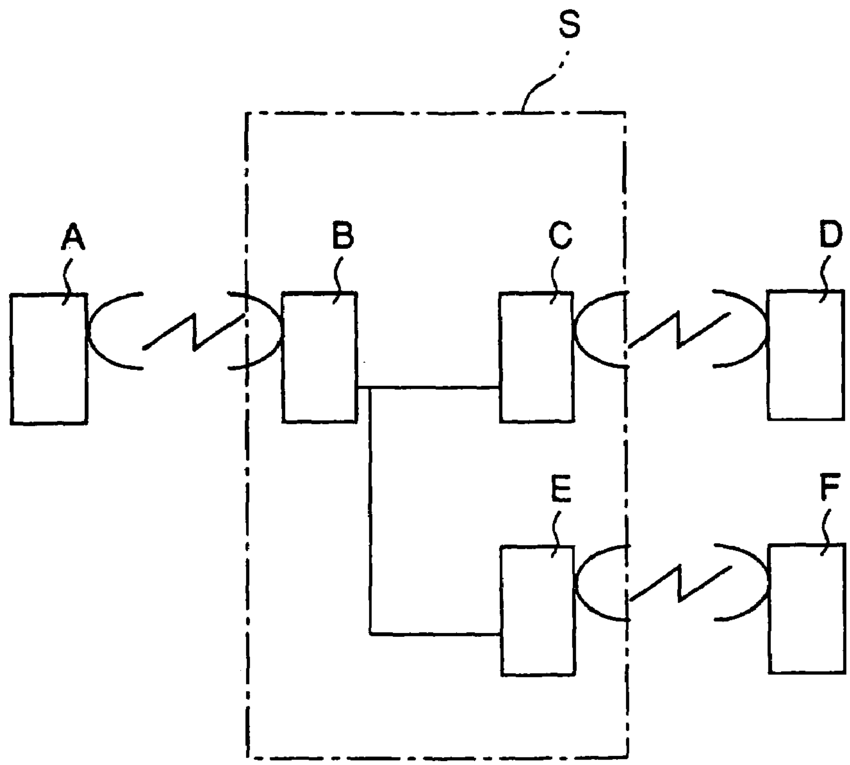
FIG. 1 is a system block diagram generally showing an order wire transmission system.
Figure 2:
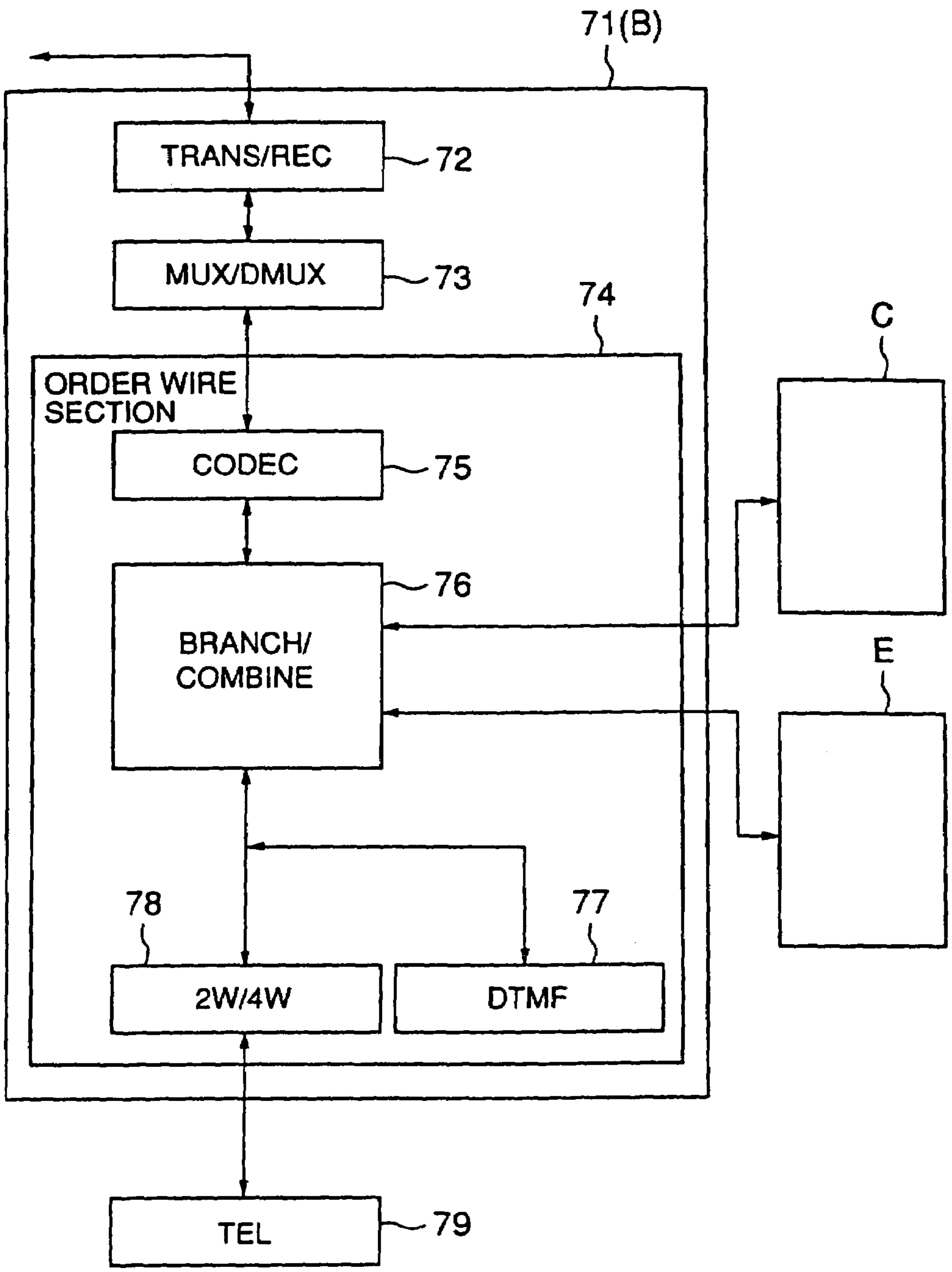
FIG. 2 is a system block diagram for explaining an important part of a conventional transmission apparatus.

FIG. 4 shows a case where the connection and arrangement of the transmission apparatuses 1-1, 1-2 and 1-3 are similar to those of the transmission apparatuses NE2, NE3 and NE7 shown in FIG. 3. Each of the transmission apparatuses 1-1 through 1-3 have the order wire section 4 which is provided with the monitoring processor 9 having the same construction. The transmission apparatuses 1-1 through 1-3 are connected to each other via the analog branching and combining section 6 of the order wire section 4. The illustration of the transmission paths for the multiplexed signals exchanged among the transmission apparatuses 1-1 through 1-3 is omitted in FIG. 4. As described above, the order wire section 4 includes the codec section 5, the analog branching and combining section 6, the office DTMF transmitting and retrieving section 7 and the 2W/4W converter 7 which are similar to those of the conventional transmission apparatus shown in FIG. 2. The order wire section 4 additionally includes the monitoring processor 9 which has a construction which enables connection to the monitoring control terminal TE shown in FIG. 3. An instruction to test the order wire line and the like can be made from the monitoring control terminal TE to the order wire monitoring controller 11 of the monitoring processor 9.

The transmitter and receiver section 2 has transmitting and receiving functions corresponding to the line type, such as the radio line, cable line and optical line. The multiplexing and demultiplexing section 3 has functions for multiplexing and demultiplexing control signals and order wire signals in conformance with a multiplexing system such as PDH and SDH. The transmitting and received data storage section 12 and the analyzed data storage section 14 within the monitoring processor 9 of the order wire section 4 are formed by random access memories (RAMs) or the like. On the other hand, functions of the order wire monitoring controller 11, the data analyzer 13 and the comparing and judging section 15 of the monitoring processor 9 may be realized by functions of a processor or the like.

When making a normal prearranged communication by the telephone set 16 which is connected to the transmission apparatus 1-1 via the 2W/4W converter 8, the transmission apparatus of the other party is specified by a DTMF signal from the office DTMF transmitting and retrieving section 7, similarly as in the conventional case. The specified transmission apparatus recognizes by the office DTMF transmitting and retrieving section 7 thereof, based on the received DTMF signal, that this transmission apparatus is specified, and makes a called indication by ringing a bell, for example. Hence, the prearranged communication can be started between the transmission apparatus 1-1 and the specified transmission apparatus via the order wire line.

Figure 5:
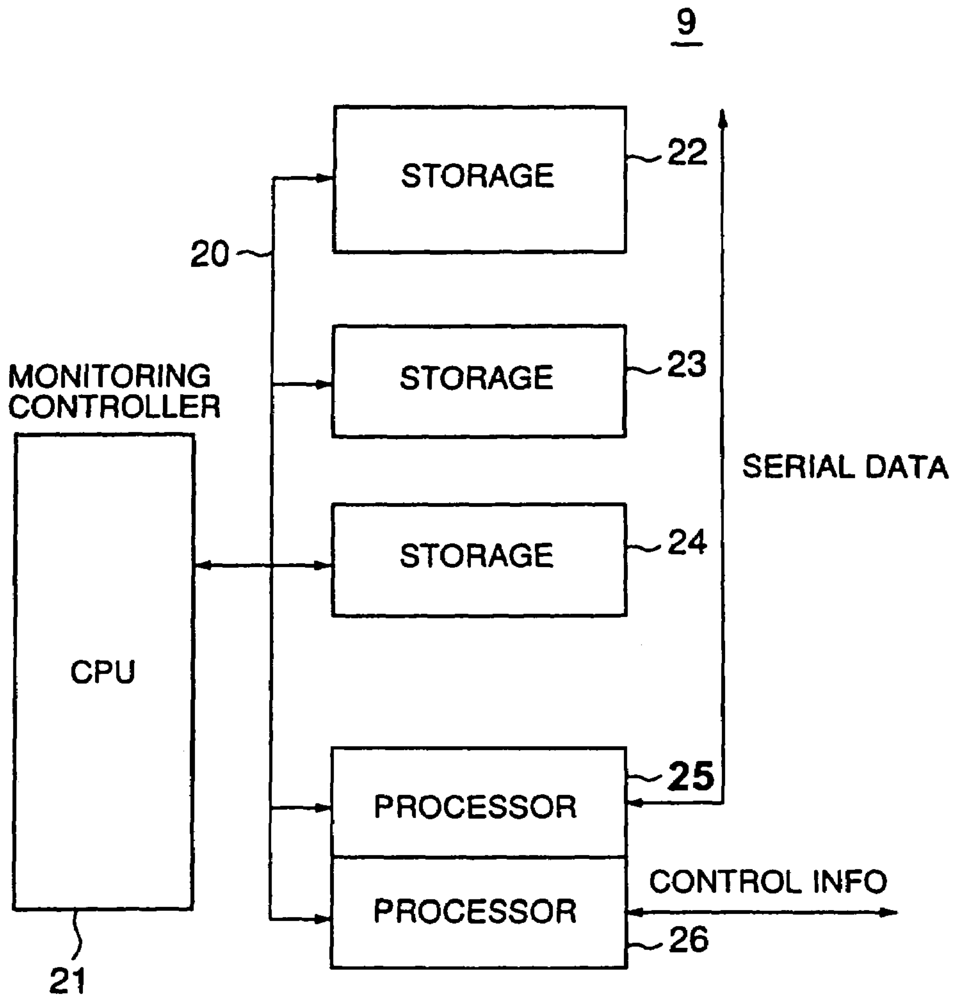
FIG. 5 is a system block diagram for explaining a monitoring processor of the first embodiment

FIG. 5 is a system block diagram showing the monitoring processor 9 of this first embodiment. In FIG. 5, the order wire monitoring controller 11 is formed by a processor (CPU) 21. This CPU 21 is connected to a data analysis and comparison judging program storage 22, an analyzed data storage 23, a transmitting and received data storage 24, a test data communication processor 25 and a control information communication processor 26, via an internal bus 20. The control information communication processor 26 transmits and receives the control information which is multiplexed and demultiplexed by the multiplexing and demultiplexing section 3, via a control channel. The test data communication processor 25 has functions for transmitting and receiving the test data via the order wire line.

The data analysis and comparison judging program storage 22 stores a program for realizing the functions of the data analyzer 13 and the comparing and judging section 15 shown in FIG. 4. The analyzed data storage 23 and the transmitting and received data storage 24 respectively correspond to the analyzed data storage section 13 and the transmitting and received data storage section 12 shown in FIG. 4. In addition, the data analysis and comparison judging program storage 22, the analyzed data storage 23 and the transmitting and received data storage 24 may be formed by RAMs or the like.

Figure 6:
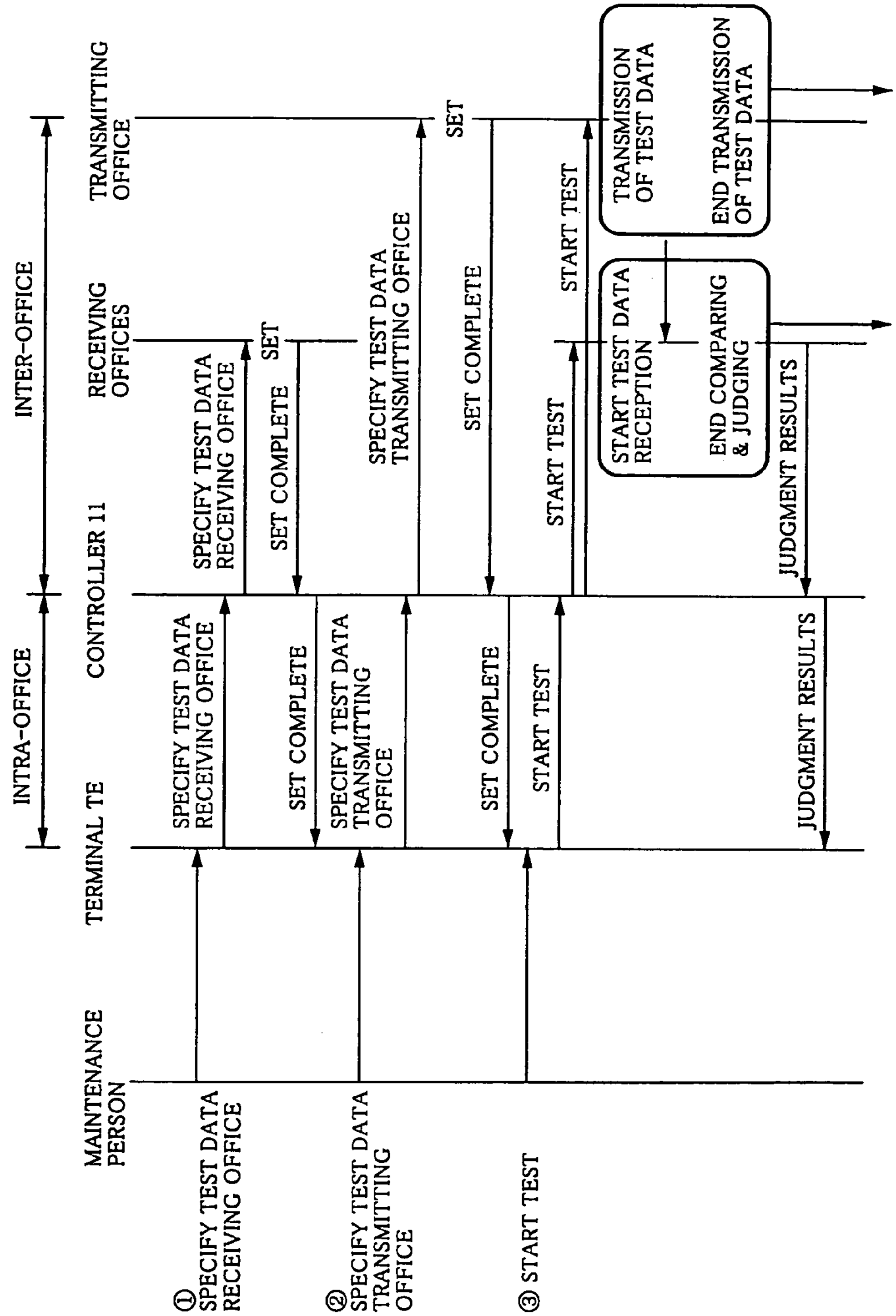
FIG. 6 is a time chart for explaining the operation of the first embodiment.

FIG. 6 is a time chart for explaining the operation of this first embodiment. More particularly, FIG. 6 shows timings of the operation between an intra-office and an inter-office, where the intra-office includes the maintenance or service person, the monitoring control terminal TE and the order wire monitoring controller 11, and the inter-office includes the receiving office and the transmitting office. Each office includes the transmission apparatus shown in FIG. 4. The maintenance or service person operates the monitoring control terminal TE, and specifies the test data receiving office (test data receiving transmission apparatus) as indicated by 1 in FIG. 6.

The transmission apparatus which is connected to this monitoring control terminal TE is regarded as the intra-office. Specifying information of the test data receiving office is transmitted from the order wire monitoring controller 11 of the monitoring processor 9 of the intra-office, via a control signal line, using time slots of the multiplexed signals, specific bytes of a header or the like. The control information in this case includes a transmitting source address, so that the specified test data receiving office can return a set complete to the transmitting source after setting the test data reception. When the set complete is received by the monitoring control terminal TE and the maintenance or service person confirms the receipt thereof, the test data transmitting office (test data transmitting transmission apparatus) is specified as indicated by 2 in FIG. 6.

In addition, the specified test data transmitting office sets the test data in the transmitting and received data storage section 12, and returns a set complete to the transmitting source. Of course, it is possible to prestore the test data in the transmitting and received data storage section 12, and return a transmission enable state as the set complete. When the set complete is received by the monitoring control terminal TE and the maintenance or service person confirms the receipt thereof, a test start is instructed as indicated by 3 in FIG. 6. In response to this test start instruction, the monitoring processor 9 of the specified test data transmitting office reads the test data stored in the transmitting and received data storage section 12 under the control of the order wire monitoring controller 11. The read test data are input to the multiplexing and demultiplexing section 3, and the test data are multiplexed and transmitted as the order wire signals.

Figure 7:
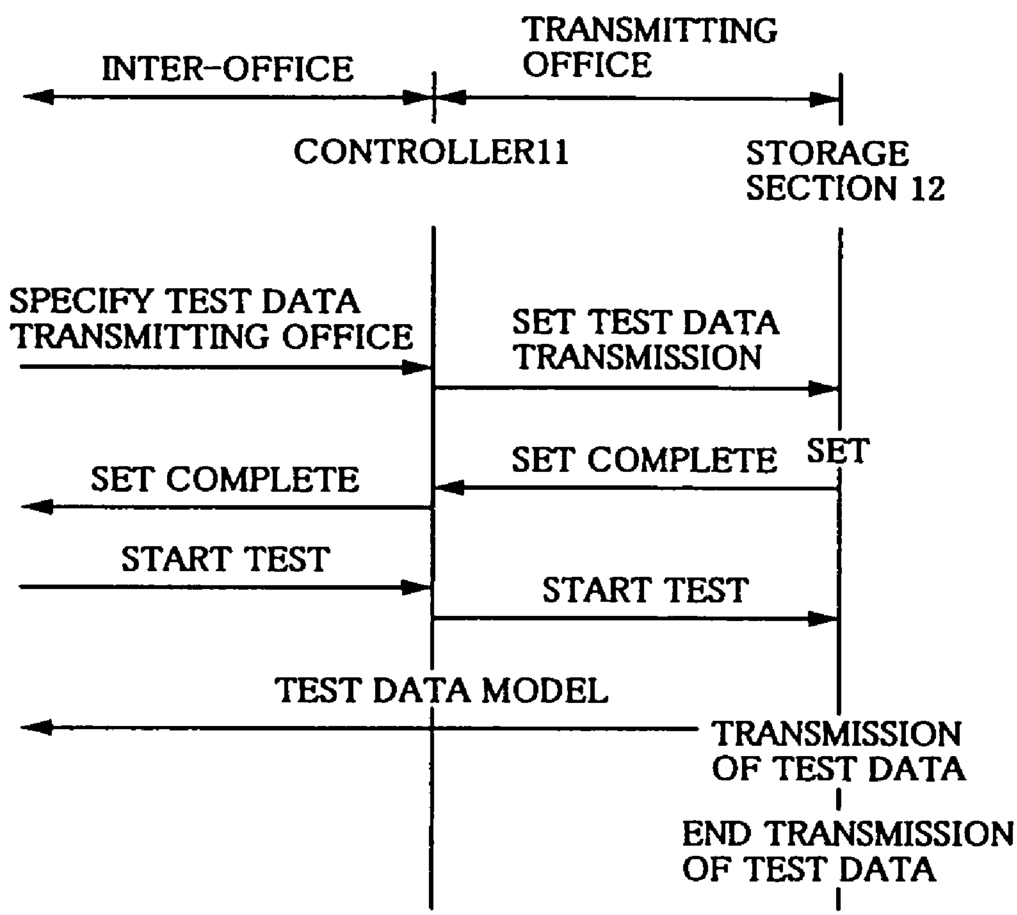
FIG. 7 is a time chart for explaining the operation of a specified test data transmitting office.

FIG. 7 is a time chart for explaining the operation of the specified test data transmitting office. When the order wire monitoring controller 11 receives and identifies the control information specifying the test data transmitting office, the order wire monitoring controller 11 sets the test data in the transmitting and received data storage section 12 and transmits a set complete. Next, when the test start instruction is received, the order wire monitoring controller 11 starts transmitting the test data set in the transmitting and received data storage section 12. In other words, the test data are transmitted to the order wire line, as shown as a test data model which is indicated by a bold line.

In addition, the specified test data receiving office stores the order wire signals which are demultiplexed by the multiplexing and demultiplexing section 3 in the transmitting and received data storage section 12 under the control of the order wire monitoring controller 11. The data analyzer 13 analyzes the order wire signals, and the analyzed data are stored in the analyzed data storage section 14. The comparing and judging section 15 compares the analyzed data and threshold values, and judges the quality of the order wire line. The judgement data indicative of this judgement are stored in the transmitting and received data storage section 12.

Under the control of the order wire monitoring controller 11, the judgement data are transmitted to the specified test data transmitting office as judgement results, and the judgement results are received by the monitoring control terminal TE. The maintenance or service person judges the quality of the order wire line between the specified test data transmitting office and the specified test data receiving office, based on display contents and the like of the received judgement results. Accordingly, it becomes possible to monitor the order wire line between arbitrary transmission apparatuses, at an arbitrary transmission apparatus.

Figure 8:
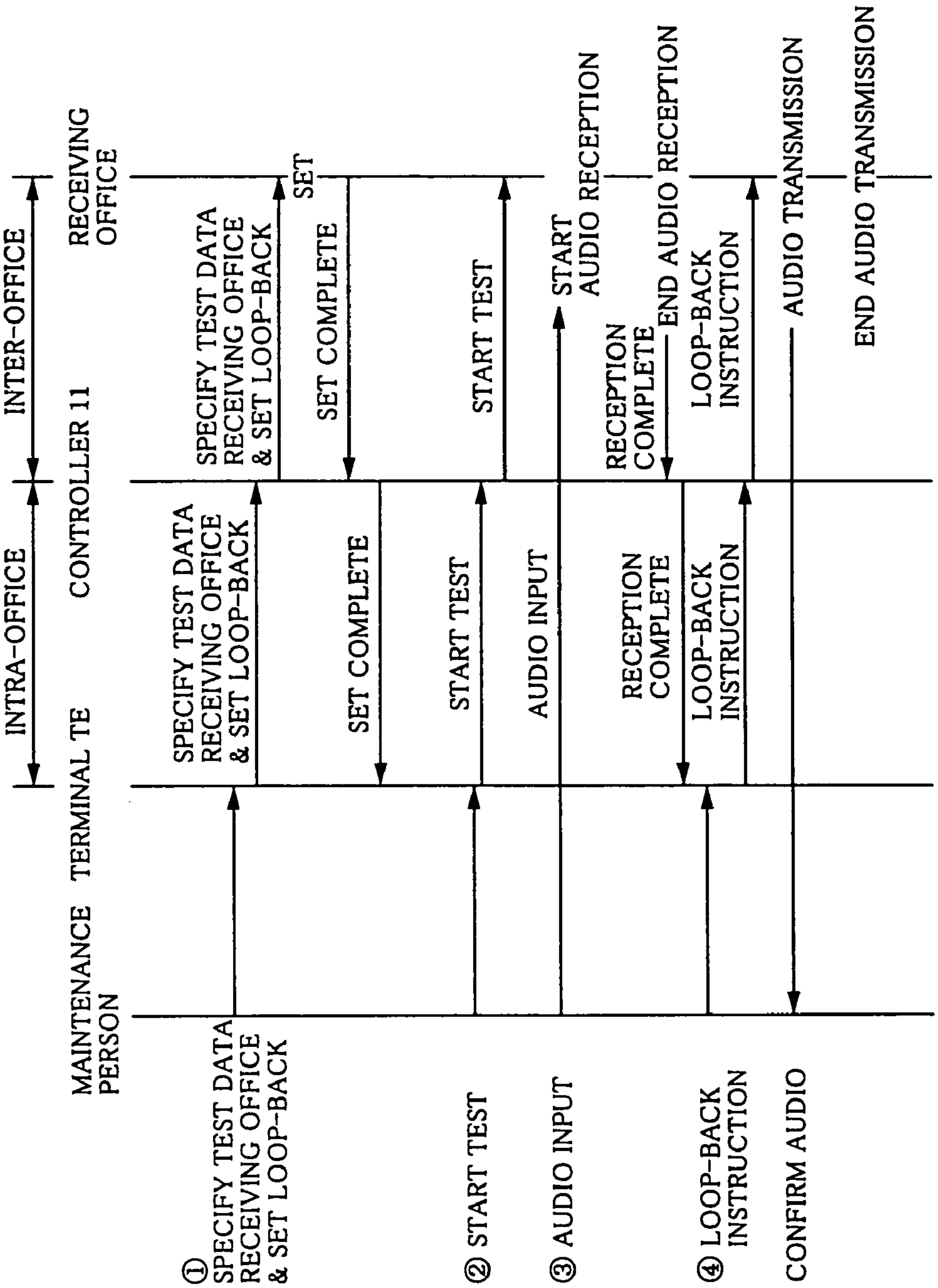
FIG. 8 is a time chart for explaining the operation of a second embodiment of the transmission apparatus according to the present invention.

FIG. 8 is a time chart for explaining the operation of a second embodiment of the transmission apparatus according to the present invention. In this second embodiment, the basic construction of the transmission apparatus is the same as that of the first embodiment shown in FIG. 4, and an illustration thereof will be omitted.

FIG. 8 shows a case where the order wire line is monitored using audio signals. As indicated by 1, the maintenance or service person makes inputs to specify the test data receiving office and to set the loop-back, using the monitoring control terminal TE. Hence, control information including information related to the specified test data receiving office and the loop-back setting is transmitted under the control of the order wire monitoring controller 11. The specified test data receiving office makes the setting so that the test data can be received and stored in the transmitting and received data storage section 12 of the monitoring processor 9, and returns a set complete.

The maintenance or service person confirms the setting complete which is received, and makes inputs to start the test as indicated by 2 in FIG. 8. After transmitting control information related to this starting of the test to the specified test data receiving office, the maintenance or service person makes an audio signal input from the telephone set 16 which is connected to the order wire section 4, as indicated by 3. The audio signals are converted into digital signals by the codec section 5, and are multiplexed by the multiplexing and demultiplexing section 3 and transmitted as order wire signals.

In the specified test data receiving office, the order wire signals (digital signals) which are demultiplexed by the multiplexing and demultiplexing section 3 are stored in the transmitting and received data storage 12 under the control of the order wire monitoring controller 11 of the monitoring processor 9. When reception of the audio data ends, a reception complete is returned from the order wire monitoring controller 11.

The maintenance or service person confirms the reception complete which is received, and inputs a loop-back instruction as indicated by 4 in FIG. 8. In the specified test data receiving office, the audio data stored in the transmitting and received data storage 12 are read under the control of the order wire monitoring controller 11, in response to the loop-back instruction. The read audio data are input to the multiplexing and demultiplexing section 3, and are transmitted to the order wire line. On the other hand, in the specified test data transmitting office, the order wire signals which are demultiplexed by the multiplexing and demultiplexing section 3 are converted into analog signals by the codec section 5. Hence, audio signals are input to the telephone set 16 via the analog branching and combining section 6 and the 2W/4W converter 8, so as to judge a deteriorated state of the looped back audio signals corresponding to the transmitted audio signals. For example, if the clarity of the looped back audio signals is low, it may be judged that the quantization errors have accumulated.

As described above, FIG. 8 shows the case where the audio data are returned in response to the loop-back instruction from the specified test data transmitting office. However, it is of course possible to carry out a control so that the specified test data receiving office transmits the audio data stored in the transmitting and received data storage section 12 to the specified test data transmitting office, after a predetermined time elapses from the time when the specified test data receiving office receives the audio data as the test data.

Figure 9:
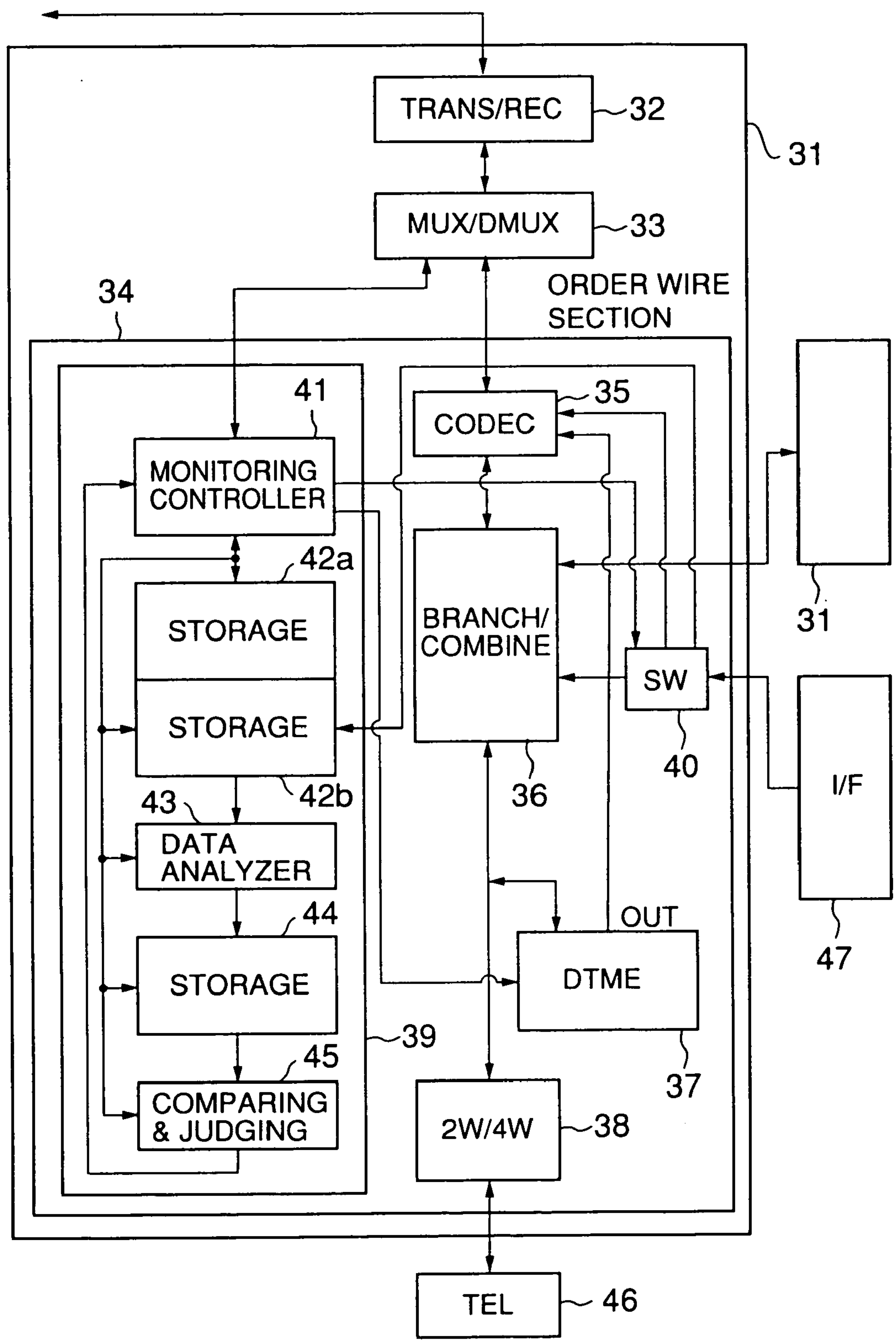
FIG. 9 is a system, block diagram showing an important part of a third embodiment of the transmission apparatus according to the present invention.

FIG. 9 is a system block diagram showing an important part of a third embodiment of the transmission apparatus according to the present invention.

Each transmission apparatus 31 shown in FIG. 9 includes a transmitter and receiver section 32, a multiplexing and demultiplexing section 33, and an order wire section 34. The order wire section 34 includes a codec section 35, an analog branching and combining section 36, an office DTMF transmitting and retrieving section 37, a 2W/4W converter 38, a monitoring processor 39, and a switching circuit 40.

The monitoring processor 39 includes an order wire monitoring controller 41, a received data storage section 42*a*, a transmitting data storage section 42*b*, a data analyzer 43, an analyzed data storage section 44, and a comparing and judging section 45. A telephone set 46 is connected to the 2W/4W converter 38 of the order wire section 34. In addition, an external interface 47 is connected to the switching circuit 40 of the order wire section 34.

Similarly as in the case of the first embodiment of the transmission apparatus shown in FIG. 4, the illustration of the transmission path of the multiplexed signals is omitted in FIG. 9. In addition, the monitoring processor 39 shown in FIG. 9 has a construction similar to that of the monitoring processor 9 shown in FIG. 4, except that regions of the transmitting and received data storage section 12 are divided into the received data storage section 42*a* and the transmitting data storage section 42*b*. FIG. 9 shows a case where another transmission apparatus 31 and the external interface 47 are connected to the analog branching and combining section 36.

The switching circuit 40 which is connected between the analog branching and combining section 36 and the external interface 47 is controlled by the order wire monitoring controller 41. When digital signals, that is, test data, are input from the external interface 47, the switching circuit 40 is switched so as to input the test data to the multiplexing and demultiplexing section 33 as the order wire signals. On the other hand, when inputting analog signals, that is, the test data, the switching circuit 40 is switched so as to input the test data to the codec section 35 and convert the test data into digital signals.

Furthermore, when using DTMF signals from the office DTMF transmitting and retrieving section 37 as the test data, the DTMF signals are generated depending on the control of the order wire monitoring controller 41 and are input to the codec section 35. The DTMF signals are converted into digital signals by the codec section 35, and are input to the multiplexing and demultiplexing section 33 and multiplexed as order wire signals. In this case, the generated DTMF signals correspond to a dummy number other than the number which specifies the transmission apparatus 31.

Figure 10:
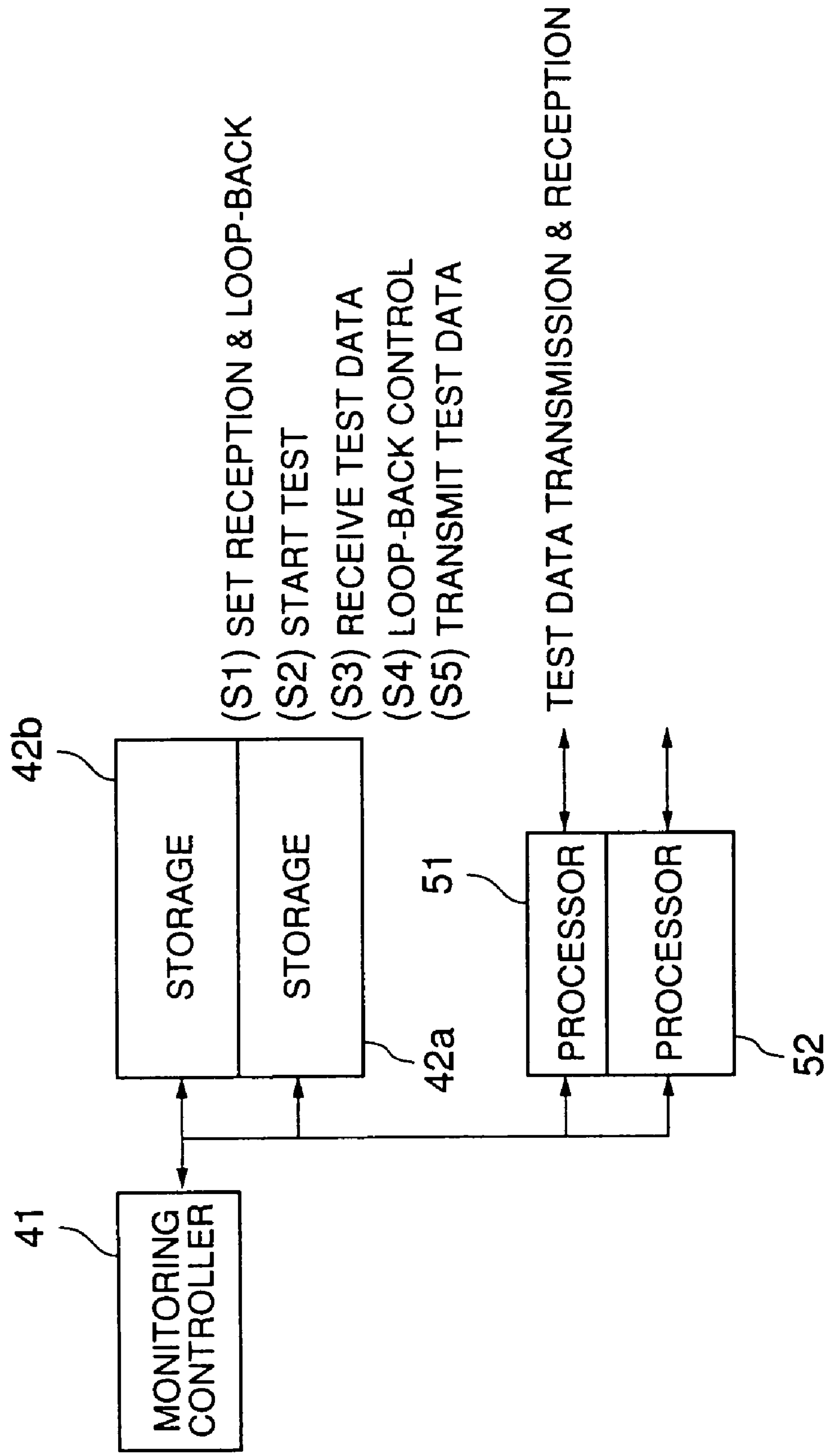
FIG. 10 is a system block diagram for explaining a test data loop-back control.

FIG. 10 is a system block diagram for explaining a test data loop-back control. FIG. 10 shows the order wire monitoring controller 41, the transmitting data storage section 42*b*, the received data storage section 42*a*, a communication processor 51, and a monitoring control communication processor 52. In this case, the transmitting data storage section 42*b* stores the test data (model). For example, when the transmission apparatus 31 is specified as the test data transmitting office, the test data (model) stored in the transmitting data storage section 42*b* of this transmission apparatus 31 are transmitted via the communication processor 51.

In addition, when looping back the test data, that is, the audio signals, so as to judge the quality of the order wire line and the like as shown in FIG. 8, the specified test data receiving office carries out the following steps (S1) through (S5). The step (S1) specifies the test data receiving office and sets the loop-back. The step (S2) starts the test, and the step (S3) receives the test data. The step (S4) carries out the loop-back control, and the step (S5) transmits the test data. In accordance with the above described steps (S1) through (S5), the order wire monitoring controller 41 stores the test data which are received via the communication processor 51 into the received data storage section 42*a*. Further, by carrying out the loop-back control depending on the instruction from the specified test data transmitting office, the order wire monitoring controller 41 reads the stored test data from the received data storage section 42*a* and transmits the read test data via the communication processor 51.

The loop-back control described above is not limited to the case where the audio signals are used as the test data. In addition, such a loop-back control can also be made by a transmission apparatus having the construction shown in FIG. 4. Moreover, the loop-back control of the step (S4) may be made in response to the instruction from the specified test data transmitting office or, after a predetermined elapses from the time when the reception of the test data ends in the specified test data receiving office by transmitting the test data under the control of the order wire monitoring controller 41.

Figure 11:
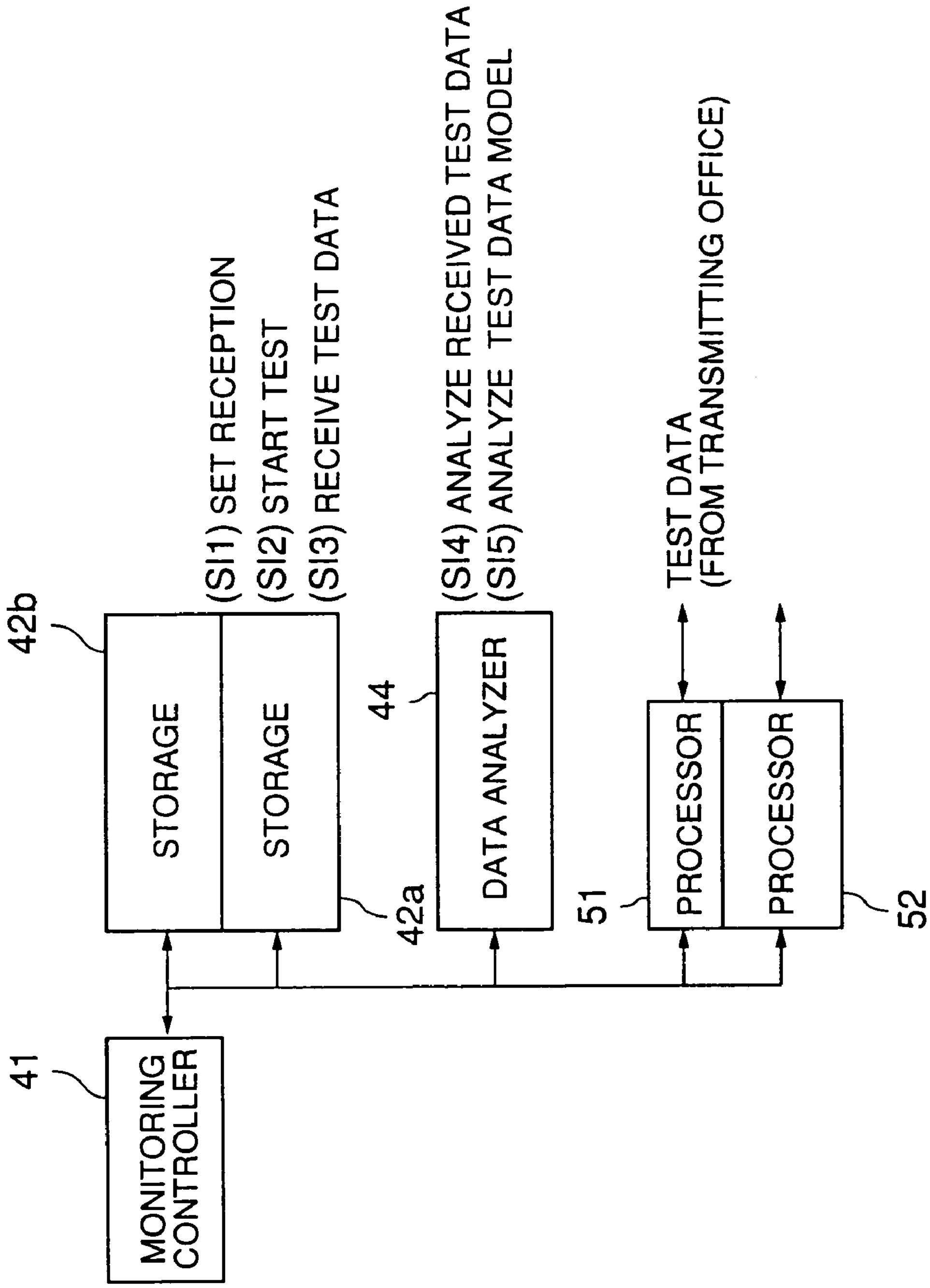
FIG. 11 is a system block diagram for explaining a test data analysis control.

FIG. 11 is a system block diagram for explaining a test data analysis control. FIG. 11 shows the data analyzer 44 in addition to the elements shown in FIG. 10. In FIG. 11, the specified test data receiving office carries out the following steps (S11) through (S15). Under the control of the order wire monitoring controller 41, the step (S11) sets the reception, the step (S12) starts the test, the step (S13) receives the test data, the step (S14) analyzes the received test data, and the step (S15) analyzes the test data model. By carrying out the steps (S11) through (S13), the test data which are received via the communication processor 51 are stored in the received data storage section 42*a*. In addition, by carrying out the steps (S14) and (S15), the data analyzer 44 analyzes the test data stored in the received data storage section 42*a*, and analyzes the test data (mode) stored in the transmitting data storage section 42*b*.

Figure 12:
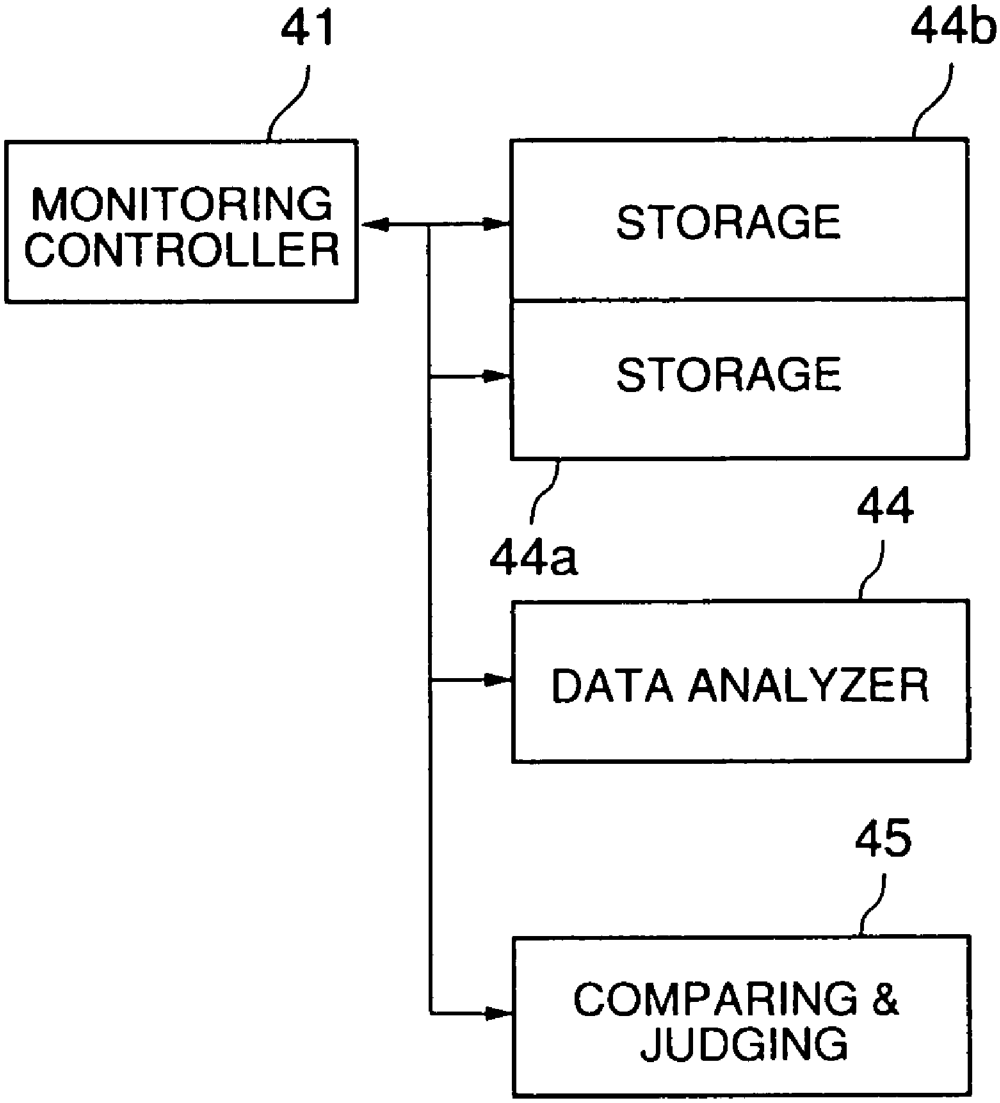
FIG. 12 is a system block diagram for explaining a test data judging control.

FIG. 12 is a system block diagram for explaining a test data judging control. In FIG. 12, the analyzed data storage section 44 shown in FIG. 9 is formed by a region 44*b* for storing the analyzed data of the model test data, and a region 44*a* for storing the analyzed data of the received test data. The comparing and judging section 45 makes the comparison and judgement with respect to the analyzed data, so as to judge the quality of the order wire line and the like. In this case, when the test data are predetermined, it is possible to obtain the corresponding analyzed data in advance, and prestore the analyzed data in the region 44*b* of the analyzed data storage section 44.

Figure 13A:
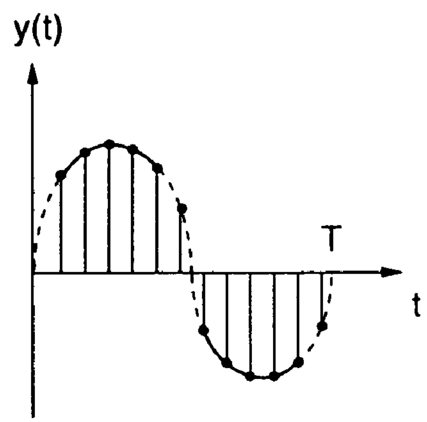
FIGS. 13A and 13B are diagrams for explaining test data analysis.
Figure 13B:
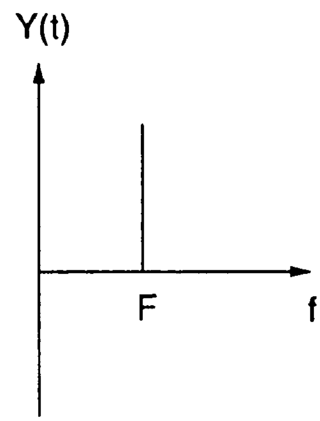
Figure 14A:
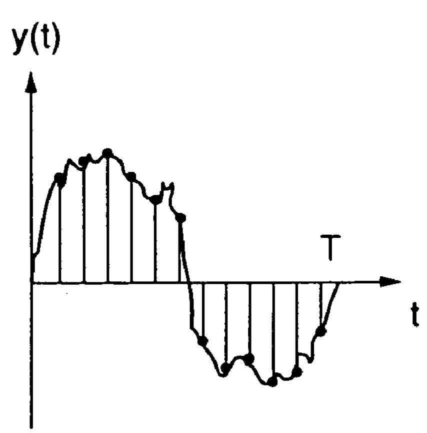
FIGS. 14A and 14B are diagrams for explaining the test data analysis.
Figure 14B:
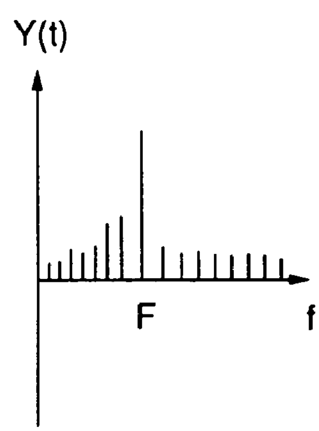

FIGS. 13A, 13B, 14A and 14B are diagrams for explaining test data analysis. In FIGS. 13A and 14A, the abscissa indicates the time t. In FIGS. 13B and 14B, the abscissa indicates the frequency f.

FIG. 13A shows sinusoidal test data (model test data) having a period T, and FIG. 13B shows a fundamental wave of a frequency F which is obtained by discrete Fourier transform. The discrete Fourier transform can be described by the following formulas (1) and (2), where "a" indicates π and n indicates the number of data samples in terms (j2aft/n) and (−j 2aft/n).

$$y(t) = (1/n)\sum_{f=0}^{n-1} Y(f)e^{(j2aft/n)} \tag{1}$$

$$Y(f) = \sum_{t=0}^{n-1} y(t)e^{(-j2aft/n)} \tag{2}$$

In addition, FIG. 14A shows a waveform of the received test data, and FIG. 14B shows a result which is obtained by carrying out the discrete Fourier transform with respect to the waveform shown in FIG. 14A. In FIG. 14A, the waveform is distorted due to the quantization error and noise that is mixed. Hence, in the result shown in FIG. 14B, a large number of noise components appear on both sides of the fundamental wave of the frequency F along the frequency axis.

In the case of the test data analysis control shown in FIG. 11, the data analyzer 44 of the specified test data receiving office analyzes the test data by carrying out the discrete Fourier transform, and the analyzed results such as the results of the discrete Fourier transform shown in FIG. 14B are transmitted to the specified test data transmitting office. In this case, the comparison of the analyzed data and the threshold values and the judgement made on the comparison are made in the specified test data transmitting office.

Figure 15A:
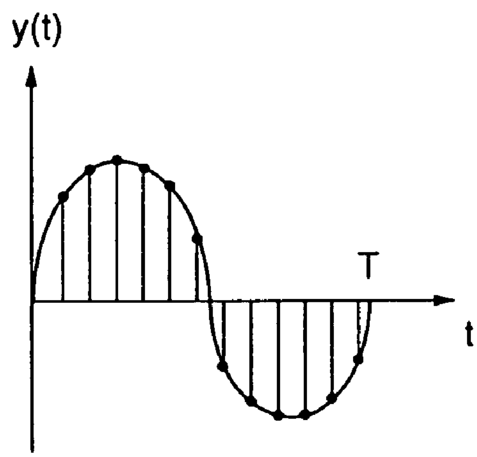
FIGS. 15A and 15B are diagrams for explaining analysis and judgement of test data.
Figure 15B:
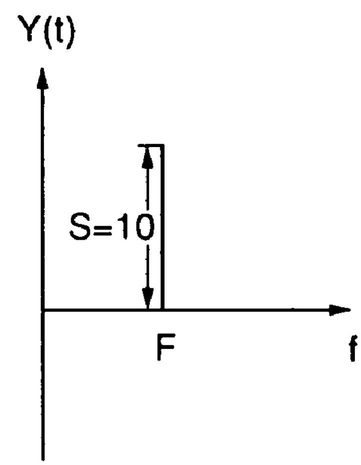
Figure 16A:
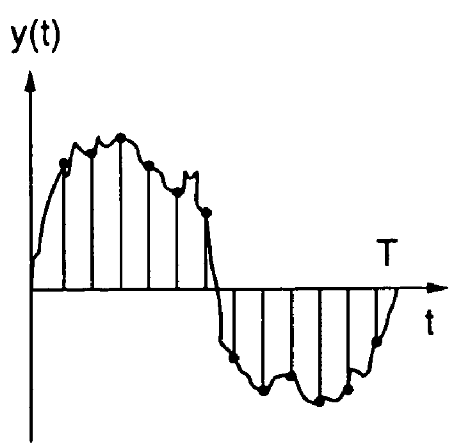
FIGS. 16A and 16B are diagrams for explaining the analysis and judgement of test data.
Figure 16B:
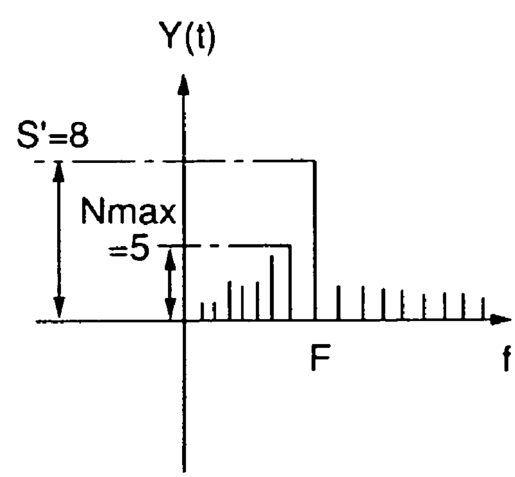

FIGS. 15A, 15B, 16A and 16B are diagrams for explaining analysis and judgement of test data. In FIGS. 15A and 16A, the abscissa indicates the time t. In FIGS. 15B and 16B, the abscissa indicates the frequency f.

FIG. 15A shows sinusoidal test data (model test data) having a period T, and FIG. 15B shows a fundamental wave of a frequency F which is obtained by discrete-Fourier transform. In FIG. 15B, it is assumed that a signal level S of the fundamental wave of the frequency F is "10".

FIG. 16A shows a waveform of the received test data, and FIG. 16B shows a result which is obtained by carrying out the discrete Fourier transform with respect to the waveform shown in FIG. 16A. In FIG. 16A, the waveform is distorted due to the quantization error and noise that is mixed. Hence, in the result shown in FIG. 16B, a large number of noise components appear on both sides of the fundamental wave of the frequency F along the frequency axis. In FIG. 16B, a signal level S' of the fundamental wave of the frequency F is "8", and a maximum noise level Nmax is "5". Of course, the levels of the fundamental wave and maximum noise vary depending on the degree of distortion of the received test data. In addition, in a state where the order wire line cannot be connected, the signal level S' of the fundamental wave of the frequency F becomes zero or close to zero.

Figure 17:
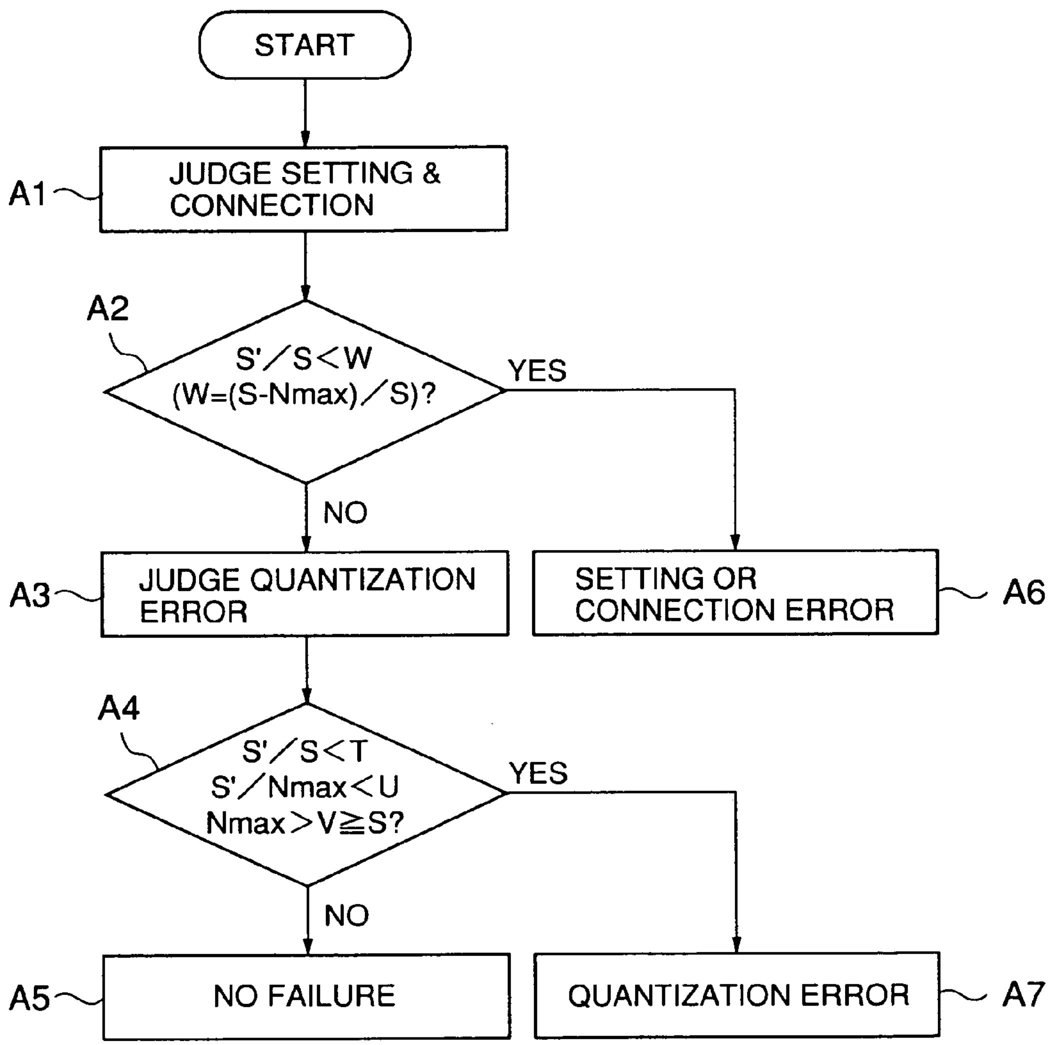
FIG. 17 is a flow chart for explaining a judging logic.

FIG. 17 is a flow chart for explaining a judging logic. The judging logic shown in FIG. 17 includes a step A1 which starts judging the error in the setting and connection, and a step A3 which starts judging the quantization error. A step A2 decides whether or not S'/S<W, where S' indicates the signal level of the fundamental wave in the analyzed data which is obtained by carrying out the discrete Fourier transform with respect to the received test data, S indicates the signal level of the transmitted test data (model), W indicates a threshold value described by W=(S−Nmax)/S, for example, and Nmax indicates the maximum noise level in the fundamental wave of the analyzed data. As described above, the test data to be transmitted are stored in the monitoring processor 9 or 39 of each transmission apparatus, and thus, the analyzed data may be obtained and prestored by analyzing in advance the prestored test data as the transmitting test data (model). In addition, the specified test data receiving office may return the analyzed data to the specified test data transmitting office, and the comparing and judging process may be carried out in the specified test data transmitting office.

The threshold value W which is used for the comparison and judgement satisfies W≦1, and is set to W=(S−Nmax)/S in this particular case. If (S'/S)<W, the signal level S' of the received test data is extremely low. Hence, if the decision result in the step A2 is YES, a step A6 judges that there is an error in the setting or connection such that the prearranged communication cannot be made via the order wire line. On the other hand, if the decision result in the step A2 is NO, it is judged that there is no error in the setting or connection, and the process advances to the step A3.

A step A4 decides whether or not conditions S'/S<T, S'/Nmax<U and Nmax>V≧S are satisfied. In this case, T indicates a signal level with which the communication is possible and satisfies T≦1, U indicates a signal-to-noise ratio level with which the communication is possible, and V indicates an upper limit value of the noise level which is set. If none of the conditions are satisfied, that is, if all of the relations S'/S<T, S7/Nmax<U and Nmax≦V simultaneously stand, the decision result in the step A4 is NO, and a step A5 judges that the quantization error is within a normal range, that is, no failure exists. On the other hand, if at least one of the conditions is not satisfied and the decision result in the step A4 is YES, a step A7 judges that the quantization error is large.

FIGS. 18A and 18B are diagrams for explaining judgement results. In a case where the analyzed results of the received test data are as shown in FIG. 18A, the results shown in FIG. 18B are obtained by setting the signal level S to S=10 and setting the threshold values T, U, V and W to T= 0.6, U=1.5, V=10 and W=(S−Nmax)/S, based on the judging logic described above. For example, in a case I, the analyzed data include S'=10 and Nmax= 2, and thus, it may be judged that there is no error in the setting or connection, since the relation {W=(10−2)/10=0.8}<{S'/S=10/10=1} stands.

Further, in the case I, it is judged that there is no failure since {S'/S=1}>{T=0.6}, it is judged that there is no failure since {S'/Nmax= 10/2=5}>{U=1.5}, and it is judged that there is not error since {Nmax=2}<{V=10}. Therefore, based on the comparison and judgement made based on the analyzed data and the threshold values, it is judged that the order wire line is normal.

On the other hand, in a case II-1, the analyzed data include S'=5 and Nmax=6, and thus, it may be judged that there is no error in the setting or connection, since the relation {W=(10−6)/10=0.4}<{S'/S=5/10=0.5} stands. In addition, in the case II-1, it is judged that there is line noise caused by quantization error accumulation since {S'/S=0.5}<{T=0.6}. Moreover, it is judged that there is line noise caused by quantization error accumulation since {S'/Nmax=5/6}<{U=1.5}. It is judged that there is not error since {Nmax=6}<{V=10}. Therefore, based on the comparison and judgement made based on the analyzed data and the threshold values, it is judged that the line noise of the order wire line is increasing due to the quantization error accumulation.

In a case II-2, the analyzed data include S'=9 and Nmax=20, and thus, it may be judged that there is no error in the setting or connection, since the relation {W=(10−20)/10=−2}<{S'I/S= 9/10=0.9} stands. In addition, in the case II-2, it is judged that there is no failure since {S'/S=9}>{T=0.6}. Moreover, it is judged that there is line noise caused by quantization error accumulation since {S'/Nmax=9/20}<{U=1.5}. It is judged that there is line noise caused by the quantization error accumulation since {Nmax=20}>{V=10}. Therefore, based on the comparison and judgement made based on the analyzed data and the threshold values, it is judged that the line noise of the order wire line is increasing due to the quantization error accumulation.

In a case III, the analyzed data include S'=0 and Nmax=1, and thus, it may be judged that there an error in the setting or connection, since the relation {W=(10−1)/10=0.9}>{'/S=0}. In other words, it is judged that an error exists in the setting or connection of the order wire line between the specified test data receiving office and the specified test data transmitting office. If a plurality of offices are connected between the specified test data transmitting office and the specified test data receiving office in this case III, it is possible to locate the office in which the error in the setting or connection exists, by successively specifying the test data receiving office.

In the case described above, the sinusoidal wave is used as the test data. However, when the DTMF signals from the office DTMF transmitting and retrieving section 37 are used as the test data, two frequency components are included in the test data. For this reason, when the data analysis is made by carrying out the discrete Fourier transform, a plurality of noise components will appear with respect to the fundamental waves of frequencies F1 and F2. Accordingly, the comparison and judgement to determine the quality of the order wire line and the like may be made by using signal levels S1 and S2 of the fundamental waves of the test data model, signal levels S1' and S2' of the fundamental waves of the received test data, and the maximum noise level Nmax.

It is also possible to use patterns of the DTMF signals as the test data. Such test patterns may easily be generated by controlling the office DTMF transmitting and retrieving section 37 from the order wire monitoring controller 41. In this case, it is possible to monitor the order wire line based on the analyzed data of the test patterns and the results of the discrete Fourier transform.

Figure 19:
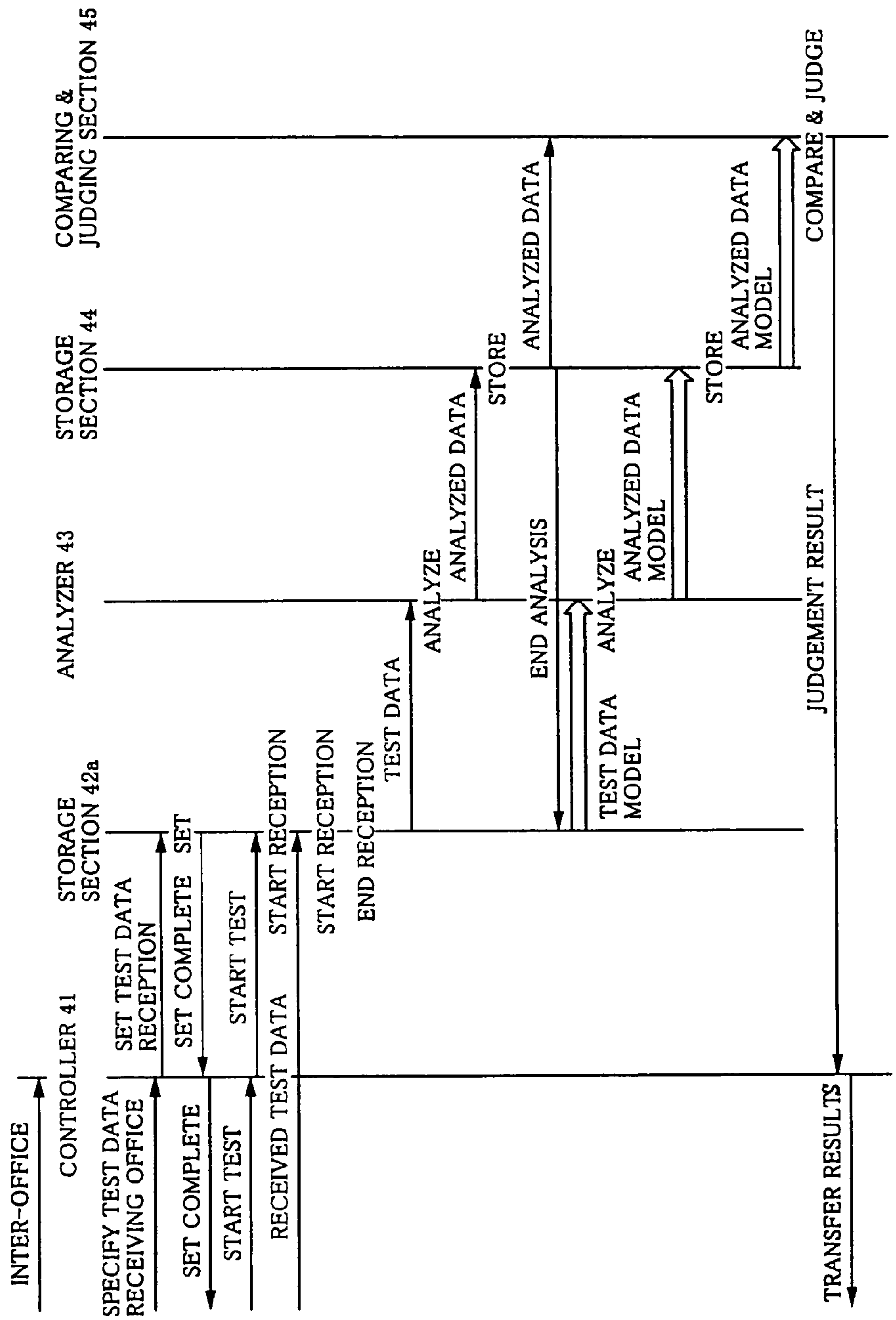
FIG. 19 is a time chart for explaining the operation of a test data receiving office.

FIG. 19 is a time chart for explaining the operation of a test data receiving office. For the sake of convenience, the operation of the test data receiving office will be described by referring to the construction shown in FIG. 9.

In FIG. 19, when the order wire monitoring controller 41 of the test data receiving office receives and identifies the control information specifying the test data receiving office, the order wire monitoring controller 41 makes a setting so that the received test data can be stored in the received data storage section 42*a*, and the received data storage section 42*a* returns a setting complete to the order wire monitoring controller 41. The order wire monitoring controller 41 returns the setting complete to the office which transmitted the control information which specifies the test data receiving office. The received test data received via the order wire line are stored in the received data storage section 42*a*, and the stored test data are transferred to the data analyzer 43 when the reception of the test data ends. The data analyzer 43 makes the data analysis by carrying out the discrete Fourier transform or the like with respect to the received test data, and stores the analyzed data indicative of the analyzed results into the analyzed data storage section 44. The stored analyzed data are then transferred to the comparing and judging section 45.

When the analyzed data are stored in the analyzed data storage section 44 and the data analysis ends, the test data model stored in the received data storage section 42*a* or the transmitting data storage section 42*b* are transferred to the data analyzer 43. If a plurality of kinds of test data exist and the test data transmitting office selects and transmits the test data from the plurality of kinds, information which indicates the kind of test data is notified to the test data receiving office using the control information or the like. Hence, the test data receiving office can select, as the test data model, the corresponding kind of test data based on this notification from the test data transmitting office, and transfer the test data model to the data analyzer 43. In this case, the data analyzer 43 of the test data receiving office can analyze the test data model similarly to analyzing the received test data, by carrying out the discrete Fourier transform or the like. In the test data receiving office, the analyzed data indicative of the analyzed results are stored in the analyzed data storage section 44, and the stored analyzed data are transferred to the comparing and judging section 45. Of course, it is possible to prestore the analyzed data with respect to the test data model.

In the test data receiving office, the comparing and judging section 45 compares and judges the analyzed results of the test data model (transmitted test data) and the received test data, similarly as described above, and judges whether or not an error exists in the setting or connection of the order wire line, and whether or not line noise exists due to quantization error accumulation. Judgement results of the comparing and judging section 45 are transmitted from the order wire monitoring controller 41 as control information, to the test data transmitting office or the office to which the monitoring control terminal TE is connected.

Of course, it is possible to appropriately combine the embodiments described above to achieve the object of the present invention. The application of the present invention is also not limited to the systems described above, and the present invention may similarly be applied to various kinds of network systems formed by transmission apparatuses which carry out the prearranged communication.

In addition, if a monitoring control terminal is connected in advance to each transmission apparatus, it is possible to test the order wire line between desired transmission apparatuses from an arbitrary transmission apparatus. An order wire monitoring method according to the present invention may employ such an arrangement or, any one or combination of the embodiments described above.

Further, the present invention is not limited to these embodiments, but various variations and modifications may be made without departing from the scope of the present invention.

What is claimed is:

1. A transmission apparatus adapted to receive instructions from a remote monitoring control terminal, comprising:
- a multiplexing and demultiplexing section to carry out a multiplexing and a demultiplexing; and
- an order wire section to convert received order wire signals demultiplexed by said multiplexing and demultiplexing section into analog signals, and to convert transmitting order wire signals into digital signals which are input to said multiplexing and demultiplexing section,
- said order wire section comprising:
- a codec section to carry out an analog-to-digital conversion and a digital-to-analog conversion with respect to order wire signals;
- a branching and combining section to branch and combine analog order wire signals;
- a 2-wire/4-wire converter which is capable of coupling to a telephone set; and
- a monitoring processor which includes a storage section to store transmitting and received data, and an order wire monitoring controller,
- said order wire monitoring controller controlling transmission of test data stored in said storage section to an order wire line, controlling storage of test data received via the order wire line to said storage section, and controlling transmission and reception of one of the received test data, analyzed data of the received test data, and judgment data indicative of a judgment result of a comparison of the analyzed data and threshold values, in response to an instruction from the monitoring control terminal.

2. The transmission apparatus as claimed in claim 1, wherein said monitoring processor further includes:

a data analyzer to analyze the received test data stored in said storage section and to obtain analyzed data; and a comparing and judging section to obtain the judgment data indicative of a judgment based on a comparison of the analyzed data and the threshold values, said order wire monitoring controller controlling said storage section and said data analyzer, and controlling transmission of the judgment data from said comparing and judging section, in response to an instruction from the monitoring control terminal.

3. The transmission apparatus as claimed in claim 2, wherein said order wire monitoring controller stores audio data in said storage section as the received test data, and controls a loop-back transmission of the audio data stored in said storage section to a transmitting source, in response to a lapse of a predetermined time or a transmission instruction from the monitoring control terminal.

4. An order wire transmission system which couples a plurality or transmission apparatuses via multiplexed lines which multiplex and transmit main and order wire signals, wherein:

each transmission apparatus includes a multiplexing and demultiplexing section and an order wire section, said order wire section comprising a codec section to carry out an analog-to-digital conversion and a digital-to-analog conversion with respect to order wire signals, a branching and combining section to branch and combine analog order wire signals, a 2-wire/4-wire converter which is capable of coupling to a telephone set, and a monitoring processor responsive to a remote monitoring control terminal;

said monitoring processor including a storage section to store transmitting and received data, and an order wire monitoring controller to control transmission of test data stored in said storage section to an order wire line, to control storage of test data received via the order wire line to said storage section, and to control transmission of the received test data and analyzed data of the received test data; and said order wire monitoring controller including a function of receiving and identifying control information which specifies transmission or reception of the test data, a function of transmitting the test data from said storage section when specified to transmit test data, a function of receiving and storing the test data in said storage section when specified to receive the test data, and a function of controlling transmission of one of the received test data stored in said storage section, the analyzed data of the received test data, and judgment data indicative of a judgment result of a comparison of the analyzed data and threshold values to the monitoring control terminal, after a predetermined time or at a specified time, in response to an instruction from the monitoring control terminal.

5. The order wire transmission system as claimed in claim 4, wherein said monitoring processor further includes:

a data analyzer which analyzes the received test data stored in said storage section and obtains the analyzed data; and a comparing and judging section which obtains the judgment data indicative of a judgment based on a comparison of the analyzed data and the threshold values, said order wire monitoring controller controlling said storage section and said data analyzer, reception and identification of control information specifying transmission or reception of the test data, controlling transmission of the test data via the order wire line, controlling transmission of the judgment data from said comparing and judging section, and controlling reception of the test data via the order wire line.

6. The order wire transmission system as claimed in claim 5, wherein said order wire monitoring controller in said monitoring processor of each transmission apparatus stores audio data in said storage section as the received test data, and controls a loop-back transmission of the audio data stored in said storage section to a transmitting source, in response to a lapse of a predetermined time or a transmission instruction from the monitoring terminal.

7. An order wire monitoring method for monitoring from a monitoring control terminal a quality of an order wire line which couples a plurality of transmission apparatuses via multiplexed lines which multiplex and transmit main and order wire signals, comprising the steps of:

remotely specifying, from the monitoring control terminal, a transmission apparatus which is to transmit test data as a specified transmitting apparatus, and a transmission apparatus which is to receive test data as a specified receiving apparatus;

transmitting the test data from the specified transmitting apparatus to the order wire line in response to a start of a test instructed form the monitoring control terminal;

receiving and temporarily storing the test data in the specified receiving apparatus;

analyzing the received data to produce analyzed data, and temporarily storing the analyzed data in the specified receiving apparatus;

comparing the stored analyzed data to threshold values to produce judgement data indicative of a judgment result of the comparison;

transmitting from the specified receiving apparatus to the monitoring control terminal via the specified transmitting apparatus one of the stored received test data, the stored analyzed data of the received test data, and the judgment data, after a predetermined time or at a specified time; and monitoring, in the monitoring control terminal, the quality of the order wire line between the specified transmitting apparatus and the specified receiving apparatus based on data transmitted by the specified receiving apparatus.

8. The order wire monitoring method as claimed in claim 7, which further comprises the step of:

converting DTMF signals into digital signals, and transmitting the digital signals to the order wire line as the test data, from at least one of the specified transmitting apparatus and the specified receiving apparatus.

9. An order wire monitoring method for monitoring from a monitoring control terminal a quality of an order wire line which couples a plurality of transmission apparatuses via multiplexed lines which multiplex and transmit main and order wire signals, comprising the steps of:

remotely specifying, from the monitoring control terminal, a transmission apparatus which is to transmit test data as a specified transmitting apparatus, and a transmission apparatus which is to receive test data as a specified receiving apparatus;

transmitting the test data from the specified transmitting apparatus to the order wire line in response to a start of a test instructed from the monitoring control terminal;

receiving and temporarily storing the test data in the specified receiving apparatus;

transmitting from the specified receiving apparatus to the monitoring control terminal via the specified transmitting apparatus one of the stored received test data, analyzed data of the received test data, and judgment data indicative of a judgment result of a comparison of the analyzed data and threshold values, after a predetermined time or at a specified time;

monitoring, in the monitoring control terminal, the quality of the order wire line between the specified transmitting apparatus and the specified receiving apparatus; and judging, in the specified receiving apparatus, an error in setting or connection of the order wire line if a condition S'/S<W is satisfied, where S' denotes a signal level of a fundamental wave of the analyzed data obtained by carrying out a discrete Fourier transform with respect to the received test data, S denotes a signal level of the transmitting test data, and W denotes a threshold value.

10. The order wire monitoring method as claimed in claim 9, which further comprises the step of:

judging, in the specified receiving apparatus, a failure of the order wire line caused by accumulation of quantization errors if at least one of the conditions (S'/S)<T, (S'/Nmax)<U and Nmax>V is satisfied, where Nmax denotes a maximum noise level, T, U and V are threshold values, T denotes a signal level with which communication is possible, U denotes a signal-to-noise ratio level with which communication is possible, and V denotes a set noise level.

11. An order wire monitoring method for monitoring from a monitoring control terminal a quality of an order wire line which couples a plurality of transmission apparatuses via multiplexed lines which multiplex and transmit main and order wire signals, comprising the steps of:

remotely specifying, from the monitoring control terminal, a transmission apparatus which is to transmit test data as a specified transmitting apparatus, and a transmission apparatus which is to receive test data as a specified receiving apparatus;

transmitting the test data from the specified transmitting apparatus to the order wire line in response to a start of a test instructed from the monitoring control terminal;

receiving and temporarily storing the test data in the specified receiving apparatus;

transmitting from the specified receiving apparatus to the monitoring control terminal via the specified transmitting apparatus one of the stored received test data, analyzed data of the received test data, and judgment data indicative of a judgment result of a comparison of the analyzed data and threshold values, after a predetermined time or at a specified time;

monitoring, in the monitoring control terminal, the quality of the order wire line between the specified transmitting apparatus and the specified receiving apparatus; and judging, in the specified receiving apparatus, a failure of the order wire line caused by accumulation of quantization errors if at least one of conditions (S'/S)<T, (S'/Nmax)<U and Nmax>V is satisfied, where S' denotes a signal level of a fundamental wave of the analyzed data obtained by carrying out a discrete Fourier transform with respect to the received test data, Nmax denotes a maximum noise level, S denotes a signal level of the transmitting test data, T, U and V are threshold values, T denotes a signal level with which communication is possible, U denotes a signal-to-noise ratio level with which communication is possible, and V denotes a set noise level.

12. A transmission apparatus adapted to receive instructions from a remote monitoring control terminal, comprising:

a multiplexing and demultiplexing section to carry out a multiplexing and a demultiplexing; and an order wire section to convert received order wire signals demultiplexed by said multiplexing and demultiplexing section into analog signals, and to convert transmitting order wire signals into digital signals which are input to said multiplexing and demultiplexing section;

said order wire section comprising:

a codec section to carry out an analog-to-digital conversion and a digital-to-analog conversion with respect to order wire signals;

a branching and combining section to branch and combine analog order wire signals;

a 2-wire/4-wire converter which is capable of coupling to a telephone set; and a monitoring processor which includes a storage section to store transmitting and received data, and an order wire monitoring controller, said order wire monitoring controller controlling transmission of test data stored in said storage section to an order wire line, controlling storage of test data received via the order wire line to said storage section, and controlling transmission and reception of one of the received test data, and judgment data indicative of a judgment result of a comparison of the analyzed data and threshold values, in response to an instruction from the monitoring control terminal, said order wire monitoring controller storing audio data in said storage section as the received test data, and controlling a loop-back transmission of the audio data stored in said storage section to a transmitting source, in response to a lapse of a predetermined time or a transmission instruction from the monitoring control terminal.

13. An order wire transmission system which couples to a plurality of transmission apparatuses via multiplexed lines which multiplex and transmit main and order wire signals, wherein:

each transmission apparatus includes a multiplexing and demultiplexing section and an order wire section, said order wire section comprising a codec section to carry out an analog-to-digital conversion and a digital-to-analog conversion with respect to order wire signals, a branching and combining section to branch and combine analog order wire signals, a 2-wire/4-wire converter which is capable of coupling a telephone set, and a monitoring processor responsive to a remote monitoring control terminal;

said monitoring processor including a storage section to store transmitting and received data, and an order wire monitoring controller to control transmission of test data stored in said storage section to an order wire line, to control storage of test data received via the order wire line to said storage section, and to control transmission of the received test data and analyzed data of the received test data; and said order wire monitoring controller including a function of receiving and identifying control information which specifies transmission or reception of the test data, a function of transmitting the test data from said storage section when specified to transmit test data, a function of receiving and storing the test data in said storage section when specified to receive the test data, and a function of controlling transmission of one of the received test data stored in said storage section, the analyzed data of the received test data, and judgment data indicative of a judgment result of a comparison of the analyzed data and threshold values to the monitoring control terminal, after a predetermined time or at a specified time, in response to an instruction from the monitoring control terminal said order wire monitoring controller in said monitoring processor of each transmission apparatus storing audio data in said storage section as the received test data, and controlling a loop-back transmission of the audio data stored in said storage section to a transmitting source, in response to a lapse of a predetermined time or a transmission instruction from the monitoring control terminal.

14. An order wire monitoring method for monitoring a quality of an order wire line which couples a plurality of transmission apparatuses via multiplexed lines which multiplex and transmit main and order wire signals, comprising the steps of:

specifying a transmission apparatus which is to transmit test data as a specified transmitting apparatus, and a transmission apparatus which is to receive test data as a specified receiving apparatus;

transmitting the test data from the specified transmitting apparatus to the order wire line in response to the start of a test;

receiving and temporarily storing the test data in the specified receiving apparatus;

transmitting to the specified transmitting apparatus one of the stored received test data, analyzed data of the received test data, and judgement data indicative of a judgment result of a comparison of the analyzed data and threshold values, after a predetermined time or at a specified time;

monitoring, in the specified transmitting apparatus, the quality of the order wire line between the specified transmitting apparatus and the specified receiving apparatus; and judging an error in setting or connection of the order wire line if a condition S'/S<W is satisfied, where S' denotes a signal level of a fundamental wave of the analyzed data obtained by carrying out a discrete Fourier transform with respect to the received test data, S denotes a signal level of the transmitting test data, and W denotes a threshold value.

15. The order wire monitoring method as claimed in claim 14, which further comprises the step of:

judging a failure of the order wire line caused by accumulation of quantization errors if at least one of conditions (S'S)<T, (S'/Nmax)<U and Nmax>V is satisfied, where Nmax denotes a maximum noise level, T, U and V are threshold values, T denotes a signal level with which communication is possible, U denotes a signal-to-noise ratio level with which communication is possible, and V denotes a set noise level.

16. An order wire monitoring method for monitoring a quality of and order wire line which couples a plurality of transmission apparatuses via multiplexed lines which multiplex and transmit main and order wire signals, comprising the steps of:

specifying a transmission apparatus which is to transmit test data as a specified transmitting apparatus, and a transmission apparatus which is to receive test data as a specified receiving apparatus;

transmitting the test data from the specified transmitting apparatus to the order wire line in response to a start of test;

receiving and temporarily storing the test data in the specified receiving apparatus;

transmitting to the specified transmitting apparatus one of the stored received test data, analyzed data of the received test data, and judgement data indicative of a judgment result of a comparison of the analyzed data and threshold values, after a predetermined time or at a specified time;

monitoring, in the specified transmitting apparatus, the quality of the order wire line between the specified transmitting apparatus and the specified receiving apparatus; and judging a failure of the order wire line caused by accumulation of quantization errors if at least one of conditions (S'S)<T, (S'/Nmax)<U and Nmax>V is satisfied, where S' denotes a signal level of a fundamental wave of the analyzed data obtained by carrying out a discrete Fourier transform with respect to the received test data, Nmax denotes a maximum noise level, S denotes a signal level of the transmitting test data, T, U and V are threshold values, T denotes a signal level with which communication is possible, U denotes a signal-to-noise ratio level with which communication is possible, and V denotes a set noise level.

* * * * *